(12) United States Patent
Pavanello et al.

(10) Patent No.: US 12,018,984 B2
(45) Date of Patent: Jun. 25, 2024

(54) ON-CHIP TEMPERATURE-INSENSITIVE READ-OUT

(71) Applicants: UNIVERSITEIT GENT, Ghent (BE); IMEC VZW, Leuven (BE)

(72) Inventors: Fabio Pavanello, Lyons (FR); Dries Van Thourhout, Ghent (BE); Roeland Baets, Deinze (BE)

(73) Assignees: UNIVERSITEIT GENT, Ghent (BE); IMEC VZW, Leuven (BE)

( * ) Notice: Subject to any disclaimer, the term of this patent is extended or adjusted under 35 U.S.C. 154(b) by 240 days.

(21) Appl. No.: 17/776,032

(22) PCT Filed: Nov. 18, 2020

(86) PCT No.: PCT/EP2020/082506
§ 371 (c)(1),
(2) Date: May 11, 2022

(87) PCT Pub. No.: WO2021/099369
PCT Pub. Date: May 27, 2021

(65) Prior Publication Data
US 2022/0390280 A1 Dec. 8, 2022

(30) Foreign Application Priority Data

Nov. 19, 2019 (EP) ..................... 19210072

(51) Int. Cl.
*G01J 3/28* (2006.01)
*G01J 3/02* (2006.01)
*G01J 3/12* (2006.01)

(52) U.S. Cl.
CPC ............... *G01J 3/0294* (2013.01); *G01J 3/12* (2013.01); *G01J 3/28* (2013.01); *G01J 2003/1213* (2013.01); *G01J 2003/2879* (2013.01)

(58) Field of Classification Search
CPC .... G01J 3/0294; G01J 3/12; G01J 3/28; G01J 2003/1213; G01J 2003/2879; G01J 3/0218; G01J 3/0259; G01J 3/18
See application file for complete search history.

(56) References Cited

U.S. PATENT DOCUMENTS 6,411,756 B2 * 6/2002 Sadot ..................... G02F 1/225
385/32
6,904,205 B2 6/2005 Berolo et al.
(Continued)

FOREIGN PATENT DOCUMENTS

| EP | 0907091 A2 | 4/1999 |
| EP | 3306836 A1 | 4/2018 |
| WO | 2004001470 A1 | 12/2003 |

OTHER PUBLICATIONS

International Search Report from PCT Application No. PCT/EP2020/082506, dated Feb. 17, 2021.
(Continued)

*Primary Examiner* — Abdullahi Nur
(74) *Attorney, Agent, or Firm* — Workman Nydegger

(57) ABSTRACT

A temperature compensation method for wavelength monitoring using spectrometers on photonic integrated chips and a related temperature-compensated wavelength monitoring device include an optical filter of the chip filters a source signal to provide at least one spectral reference line to a first spectrometer to detect thermal wavelength drifts thereof. At least one spectral line to be monitored is received by the same or another spectrometer of the chip to detect wavelength shifts thereof. The detected thermal drift of the reference line is compared to calibrated thermal drifts for the reference line which is associated with a calibrated thermal drift for the spectral response curve of the spectrometer receiving the spectral line to be monitored. A thermal drift rate for the response curve of the optical filter differs from
(Continued)

a thermal drift rate for the response curve of the first spectrometer at least by an amount.

16 Claims, 5 Drawing Sheets

(56) References Cited

U.S. PATENT DOCUMENTS

| | | |
|---|---|---|
| 7,061,610 B2 | 6/2006 | Mittelstein et al. |
| 7,139,455 B1 | 11/2006 | Gunn, III et al. |
| 2003/0095736 A1* | 5/2003 | Kish, Jr. .............. H01S 5/0265 |
| | | 385/37 |
| 2011/0102804 A1 | 5/2011 | Lipson et al. |
| 2014/0161384 A1* | 6/2014 | Dwivedi .............. G02B 6/1225 |
| | | 385/11 |

OTHER PUBLICATIONS

Extended European Search Report from corresponding EP Application No. 19210072.5, dated May 14, 2020.

* cited by examiner

ON-CHIP TEMPERATURE-INSENSITIVE READ-OUT

FIELD OF THE INVENTION

The present invention relates to the field of wavelength monitoring devices and techniques on photonic integrated chips (PICs), particularly to those aiming at a reduced sensitivity to temperature variations.

BACKGROUND OF THE INVENTION

Spectrometers for photonic integrated chips (PICs) which demonstrate a reduced sensitivity to temperature variations or nearly temperature-insensitive (e.g. athermal) behavior have been described in literature and are founded on the use of a waveguide refractive index material that is characterized by a negative thermal-optic coefficient. For example, arrayed waveguide grating-based spectrometers have been reported in the document EP0907091 (A2) (LUCENT TECHNOLOGIES INC.), 07.04.1999, in which arrayed waveguides are partially formed in a material with a negative thermo-optic coefficient to compensate for those regions of the arrayed waveguides which have a positive thermo-optic coefficient.

Notwithstanding the improved thermal stability of these devices, application of these materials is problematic in view of the additional processing steps, the possibility of further integration, and their capability to withstand mechanical and chemical stress. Furthermore, the thermal stability improvement achievable for these devices is limited to the extent by which fabrication tolerances can still be complied with in the processing of these devices in a given platform; this constitutes a limiting factor for many high-resolution monitoring applications or applications requiring very good temperature insensitivity.

Also the implementation of different waveguide sections for reducing thermal sensitivity has been shown, for example in US2011102804 (A1) (CORNELL UNIVERSITY; LIPSON MICHAL; GUHA BISWAJEET) May 5, 2011. However, very precise control on waveguide geometry is needed to meet the exact specifications.

Another approach is active compensation, for instance, by heating elements arranged next to or over the spectrometer waveguides. A disadvantage thereof is given by the increased power consumption, the necessity to design a feedback control loop, the increased platform complexity and cost, and the undesirable, but often unavoidable, local self-heating effects.

SUMMARY OF THE INVENTION

Integrated optical spectrometers are a standard choice for on-chip wavelength monitoring and are usually conceived as diffractive devices such as arrayed waveguide gratings (AWGs) or planar concave gratings (PCGs) to separate different wavelength components or wavelength bands into different spatial locations, e.g. into separate spectrometer output waveguides, using multi-beam interference. The spectral response curve or transmittance curve/function of the spectrometer is defining multiple spectrometer output channels, wherein each output channel is most basically characterized by its channel wavelength position and its channel bandwidth. Consecutive output channels are separated by a spectral width—the output channel spacing. Each output channel is associated with a constructively interfering wavelength component or wavelength band of the diffraction pattern that is generated within the spectrometer and with which the output channel is typically aligned for maximum transmittance at a reference temperature. The condition for constructive interference of order m (resonance condition) is given by the formula m $\lambda_{res}=n_{eff}$ L, wherein L is the path length difference of the multiple interfering beams and $n_{eff}$ the effective refractive index of the medium in which they are propagating. From this formula the thermal wavelength drift and drift rate are obtained by applying a series expansion to the resonant wavelength $\lambda_{res}$ with respect to all those physical parameters that are affected by temperature, e.g. the effective refractive index $n_{eff}(T)$ via the thermo-optic coefficient $dn_{eff}/dT$ or the path length difference L(T) via the coefficient of (linear) thermal expansion $\beta$ describing dilation/contraction of the propagation medium, e.g. the arrayed waveguides. Other physical parameters may, depending on the technology platform, be sensitive to temperature variations too; for instance, the temperature-induced stress (interfaces and bulk thermoelastic effect) also has an influence on the effective refractive index via the photoelasticity tensor. Carrying out the expansion, neglecting thermal effects other than linear thermal expansion and the thermo-optic coefficient, and retaining first order contributions only, the following result is found for the thermal wavelength drift.

$$\Delta\lambda_{res} = \frac{\lambda_{res}}{n_g}\left(\frac{dn_{eff}}{dT} + \beta n_{eff}\right)\Delta T = r_{res}(\lambda)\,\Delta T \quad \text{(Eq.1)}$$

Here, $n_g$ is the group index and $\beta$ the linear coefficient of thermal expansion. The thermal wavelength drift rate $r_{res}$ is obtained by dividing both sides of the equation by $\Delta T$ and is generally a function of wavelength, but is approximately constant over small wavelength ranges. For instance, a ring resonator based on a 220 nm high and 450 nm wide silicon waveguide surrounded by silicon oxide based cladding material in a typical silicon-insulator (SOI) platform shows wavelength-dependent thermal wavelength drift rate $r_{res}$ that is nearly linear in the range from 1540 nm to 1560 nm, with a slope of approximately 25 fm/K/nm. Depending on the technology platform and spectrometer materials, the thermal expansion can often be neglected with respect to the thermo-optic effect. The equations assign a measurable spectral drift, i.e. the observed and quantified wavelength shift for the resonant wavelength, to a controlled temperature step, and vice versa. In consequence, an output aperture of the spectrometer at a fixed spatial position, e.g. an output waveguide, transmits different wavelength components or wavelength bands at different operating temperatures. This causes an observable thermal wavelength drift of the spectrometer transmittance curve, e.g. the wavelength positions of the spectrometer output channels are jointly displaced as a function of temperature. Therefore, a measured thermal wavelength drift of one or more fixed wavelength components relative to the spectrometer spectral response curve, e.g. relative to the output channels, allows one to deduce the temperature change the spectrometer is experiencing relative to a standard temperature. Of course, this is only true as long as the wavelength components used are themselves stabilized so as to remain unaffected by temperature changes. In wavelength monitoring applications, however, this would be detrimental to the wavelength interrogation process. For example in the field of Fiber Bragg grating (FBG) sensing devices and applications, the spectral line reflected by the Bragg grating is monitored and the shifts over time in response to local temperature and/or stress changes at the sensing site (e.g. in a building structure). In consequence, for quantifying the temperature and/or stress change at the sensing site in an unambiguous manner, state-of-the-art wavelength monitoring devices, e.g. the spectrometer, are often temperature-stabilized, e.g. by mounting on a heat sink or by using active temperature control such as heating or cooling by resistive elements, Peltier elements, or equivalents. Alternatively, there are wavelength monitoring devices, e.g. integrated spectrometers, known in the art which are designed as athermal devices. In athermal devices, the light-guides comprise portions of material with a negative thermo-optic coefficient (dn/dT<0) and also portions of material with a positive thermo-optic coefficient (dn/dT>0) such that the temperature-related variations of the optical phases accumulated over the respective portions cancel each other out.

Thus, the difficulty to overcome in on-chip spectroscopic systems is to unequivocally disentangle the contributions to the overall wavelength shift made by the inherently drifting spectral response curve of the integrated wavelength monitoring device with a variation of the operating temperature and by the independently drifting monitored spectral line respectively, also in situations in which the integrated wavelength monitoring device is not specifically conceived as an athermal device, i.e. is characterized by a substantially non-zero thermal drift rate of its spectral response curve, and in which an operating temperature of the integrated wavelength monitoring device is not actively stabilized. It is therefore an object of embodiments of the present invention to devices and methods to overcome this difficulty.

The objective is accomplished by providing a photonic integrated chip (PIC) for temperature-compensated wavelength monitoring of at least one spectral line in a predetermined range of operating temperatures of the photonic integrated chip, a method for compensating a thermal wavelength drift contribution to the wavelength shift of a monitored wavelength by the spectral response curve of an integrated optical spectrometer comprised by the photonic chip, and a wavelength monitoring device comprising the PIC according to the invention.

In a first aspect the invention relates to a photonic integrated chip (PIC) for temperature-compensated wavelength monitoring of at least one spectral line in a predetermined range of operating temperatures of the photonic integrated chip. The chip comprises an optical filter, a spectral response curve of which comprises at least one of a wavelength passband for selecting at least one spectral reference line from a wavelength continuum in a source signal that is applicable to the filter. The continuous spectrum of the source signal can be provided by the emission spectrum of a broadband light source (e.g. broad spectrum SLED), or can be achieved as a wavelength sweep of a swept source. The photonic chip also comprises a first spectrometer, a spectral response curve of which comprises a plurality of wavelength channels, e.g. the spectrometer output channels. An input of the first spectrometer is connected to the optical filter to receive the at least one spectral reference line which has been selected by the filter. Further, the first spectrometer is configured for detecting wavelength drifts of each received spectral reference line in response to temperature variations of the PIC. In addition, the first spectrometer or a further spectrometer of the photonic chip is configured for receiving at least one spectral line to be monitored and for detecting wavelength shifts thereof. The wavelength shifts that are monitored in respect of the at least one spectral line to be monitored do not depend on the operating temperature of the PIC, but are caused in another way, e.g. by temperature changes or induced stresses in a different device such as a Fibre Bragg grating sensor. The at least one wavelength passband of the optical filter is spectrally overlapping at least one wavelength channel of the plurality of wavelength channels of the first spectrometer for each temperature in the predetermined range of operating temperatures of the PIC. Hence, there is no spectral gap in which the at least one spectral reference line selected by the optical filter could not be detected by the first spectrometer. Moreover, a thermal wavelength drift rate for the spectral response curve of the optical filter differs from a thermal wavelength drift rate for the spectral response curve of the first spectrometer at least by an amount, of magnitude D, such that, over the entire range of operating temperatures of the PIC, an effective resolving power $R_{mon,eff}$ associated with the spectrometer receiving said at least one spectral line to be monitored is at least 50% of a nominal resolving power $R_{mon}$ in respect of that same spectrometer. The effective resolving power of the spectrometer that is receiving the at least one spectral line to be monitored and depends on this amount D: $R_{mon,eff}(D)$. The nominal resolving power $R_{mon}$ of a spectrometer is the resolving power obtained at constant temperature, i.e. no temperature variations of the PIC comprising the spectrometer such that a thermo-optic coefficient of spectrometer waveguides and a thermal drift of the spectrometer spectral response curve can be ignored. In contrast thereto, the effective resolving power $R_{mon,eff}$ is the resolving power of the spectrometer that is effectively obtained over a range of operating temperatures of the PIC comprising the spectrometer, i.e. by taking into account a thermo-optic coefficient of spectrometer waveguides and a thermal drift of the spectrometer spectral response curve. The effective resolving power thus correctly reflects the loss of resolution in the wavelength monitoring process which stems from a displacement in absolute wavelength position of the spectrometer spectral response curve (i.e. the thermal drift) relative to the at least one spectral line to be monitored with varying operating temperature of the PIC. This displacement, if not compensated appropriately, blurs the wavelength position of the at least one spectral line to be monitored when determined relative to the spectrometer output channels and thus prevents a more accurate knowledge on the absolute wavelength position of the at least one spectral line to be monitored. It is thus desirable to compensate for the effects caused by this displacement so that more accurate knowledge on the absolute wavelength position of the at least one spectral line to be monitored is gained, without having to use a chip thermometer. This is achieved by adding a temperature compensation value to the detected wavelength shift of the at least one spectral line to be monitored. Yet, the effective resolving power of the wavelength monitoring spectrometer is generally smaller than its corresponding nominal resolving power $R_{mon,eff} \leq R_{mon}$, because the temperature compensation value, which is applied to the detected wavelength shift for the at least one spectral line to be monitored to obtain a corrected wavelength shift, is not free of errors. In particular, this error depends on the value D. This uncertainty error on the temperature compensation value reduces the overall accuracy (resolution) of the spectrometer, i.e. reduces the nominal resolving power to the effective resolving power. In other words, the effective resolving power is taking into account the fact that, in order to obtain temperature-compensation, applying a correction term to the centre wavelength determined for the at least one spectral line to be monitored leads to a decrease in the nominal resolving power of the spectrometer that is receiving the at least one spectral line for wavelength monitoring.

The effective resolving power of the spectrometer that is receiving the at least one spectral line to be monitored, $R_{mon,eff}$, may depend on various error contributions, in addition to the absolute amount D, for instance error contributions caused by deviations of fabricated waveguide parameters from corresponding nominal waveguide parameters for PICs manufactured on a wafer.

Using the expression $R_{min}=1/\varepsilon$ for a small $\varepsilon<1$, and the fact that the resolving power is defined as $R_{mon,eff}=\lambda_{mon}/\Delta\lambda_{mon,eff}=1/\delta_{mon}$, i.e. the inverse of a relative error for the determined wavelength position, the above criterion on the resolving powers, $R_{mon,eff} \geq R_{min}$, can be re-expressed in terms of an upper bound on the relative error, e.g. $\delta_{mon} \leq \varepsilon$.

There is an intimate connection between the photonic integrated chip (PIC) and the temperature-compensated wavelength monitoring device in so far as the PIC forms an integral part of the temperature-compensated wavelength monitoring device and the PIC provides at least one spectral reference line on-chip, by selection through the optical filter, which at least one reference line is to be monitored in combination with the spectral line or lines that are interrogated by the wavelength monitoring device. Detectable wavelength shifts in respect of the combination of the at least one spectral reference line and the at least one spectral line to be monitored allow for the compensation of the thermal wavelength drift of the optical spectrometer of the PIC receiving the at least one spectral line to be monitored. To achieve this, a unique correspondence between the detected wavelength shift of the at least one spectral reference line relative to the spectral response curve of the spectrometer receiving the at least one spectral reference line and the wavelength shift detected for each spectral line to be monitored is established.

In another aspect the invention relates to a wavelength monitoring device which comprises a photonic integrated chip (PIC) according to the invention, at least one photodetector for detecting a spectral response of the first and, if present, of the further spectrometer of the PIC, and a processing unit. The spectral response of the first and, if present, of the further spectrometer comprises a plurality of spectral response signals detectable for each of a corresponding plurality of spectrometer output channels. Further, the processing unit is configured for receiving the detected spectral response signals from the photodetector as inputs, for determining a thermal wavelength drift of each spectral reference line relative to the spectral response curve of the first spectrometer based on the inputs, for determining a wavelength shift of each spectral line to be monitored relative to the spectral response curve of the first or further spectrometer based on the inputs, and for compensating the determined wavelength shift of each spectral line to be monitored by a corresponding temperature compensation value derived from the determined thermal wavelength drifts and calibration data. In this respect, the calibration data associates a predetermined thermal wavelength drift of the at least one spectral reference line relative to the spectral response curve of the first spectrometer with a predetermined thermal wavelength drift for the spectral response curve of the first or the further spectrometer relative to a fixed calibration spectral line. Being obtained for a fixed calibration spectral line, the predetermined thermal wavelength drift does not depend on the spectral response curve of the optical filter.

In a further aspect the invention relates to a temperature compensation method for wavelength monitoring using a photonic integrated chip according to an embodiment of the first aspect. The wavelength monitoring device can be used to carry out the steps of the temperature compensation method. The temperature compensation method comprises applying a source signal, which comprises a wavelength continuum, to the optical filter of the photonic integrated chip, and detecting spectrometer response signals in respect of each of a plurality of spectrometer output channels. Based on the plurality of detected spectrometer response signals, a thermal wavelength drift of each spectral reference line relative to the first spectrometer spectral response curve is then determined, as well as a wavelength shift of each spectral line to be monitored relative to the spectral response curve of the spectrometer receiving the at least one spectral line to be monitored. According to a comparison step, the determined thermal wavelength drift of the at least one spectral reference line is compared with a plurality of predetermined thermal wavelength drifts of the at least one spectral reference line relative to the spectral response curve of the first spectrometer and an associated predetermined thermal wavelength drift of the spectral response curve of the spectrometer receiving the at least one spectral line to be monitored is obtained relative to a fixed calibration line. The associated predetermined thermal wavelength drift is obtained independently of the optical filter. Alternatively, or additionally, a parametric model function is evaluated, using the determined thermal wavelength drift of the at least one spectral reference line as function argument, to obtain an associated predetermined thermal wavelength drift of the spectral response curve of the spectrometer receiving the at least one spectral line to be monitored relative to a fixed calibration line and independent of the optical filter. In a further step, the determined wavelength shift of each spectral line to be monitored is compensated by the obtained associated thermal wavelength drift of the spectral response curve of the spectrometer receiving the at least one spectral line to be monitored.

In preferred embodiments of the invention, the photodetector of the wavelength monitoring device is provided as an integrated photodetector array on the PIC, whereby a compact, mass-scalable wavelength monitoring device can be realized at a reduced cost and reduced optical coupling losses.

According to some embodiments of the invention, the optical filter of the PIC comprises at least one bandpass filter with a wavelength passband smaller than a free spectral range of the first spectrometer. This at least one bandpass filter provides additional filtering capabilities that are useful to further shape the reference line(s) defining wavelength passband or stopband (a stopband can be implemented as an intermediary band bounded by two passbands and a spectral "dip" can be determined and track analogous to a spectral peak) of the optical filter. This allows a more flexible approach to the design of the optical filter. Additionally or alternatively, a bandpass filter with a wavelength passband smaller than a free spectral range of the first spectrometer can be connected between a radiation source providing the source signal and the optical filter. For other embodiments of the invention, however, the optical filter may be implemented as a single compact narrowband optical filter without providing an additional bandpass filter as part of a composite or combined filter structure.

In preferred embodiments of the invention, the optical filter and the first and/or further spectrometer are all formed on the same substrate material. This has the advantage that the waveguides included in these optical components are almost equally affected by thermal expansion effects, which simplifies the selection of the thermal wavelength drift rates by design. In particular, the difference of thermal wavelength drift rates in respect of the spectral response curve of the optical filter and the spectral response curve of the first spectrometer is substantially independent of thermal expansion effects.

According to some embodiments of the invention, selecting at least one spectral reference line comprises selecting several spectral reference lines, which are spectrally separated by a predetermined amount. A large predetermined spectral separation of the individual spectral reference lines is beneficial to embodiments in which only one spectrometer is provided, because this precludes a spectral overlap or collision between one of the spectral reference lines and the at least one spectral line received for wavelength monitoring.

According to some embodiments of the invention, the processing unit is firmly and permanently adhered to the PIC which has the advantage that a compact, robust wavelength monitoring device can be obtained as a single integrated device that is essentially of the size of the PIC.

In some embodiments of the invention, the range of operating temperatures of the photonic integrated chip may be restricted to a narrow temperature interval of less than 20 K, e.g. a temperature interval of about 10 K or less, e.g. a temperature interval of about 5 K or less. Such a restricted range of operating temperatures of the PIC may be useful in wavelength monitoring applications which are based on implantable laser-based sensors, e.g. implantable sensors that are operating for a range of body temperatures, e.g. a range of +/−5° C. around 37° C.

In other embodiments of the invention, the range of operating temperatures of the photonic integrated chip may be encompass a wider temperature interval of more than 20 K, e.g. a temperature interval of about 40 K or more, e.g. a temperature interval of about 70 K or more, e.g. a temperature interval of about 100 K or more, e.g. a temperature interval of about 130 K or more. Such a wider range of operating temperatures of the PIC may be useful in wavelength monitoring applications in respect of structures that subject to daily and/or seasonal temperature variations, for instance structural health monitoring applications for bridges, arches, buildings, etc., which rely on Fiber-Bragg grating (FBG) sensors for sensing temperature and/or stress.

A PIC or wavelength monitoring device according to embodiments of the invention may be used for structural health monitoring and may have a range of operating temperatures of −20° C. to 50° C. or more, e.g. −50° C. to 80° C.

A PIC or wavelength monitoring device according to embodiments of the invention may be also be used for automotive LIDAR applications using frequency-modulated continuous wave (FMCW) laser light. The FMCW light emitted by an integrated laser of the wavelength monitoring device can be tracked by the PIC. For this automotive application the range of operating temperatures may be −40° C. to 120° C.

A PIC or wavelength monitoring device according to embodiments of the invention may be also be used for flow sensing applications based on an integrated laser Doppler vibrometer, in which wavelength Doppler shifts are monitored in a range of operating temperatures between about 20° C. and about 60° C.

In some embodiments of the invention, the resolving power of the at least one spectrometer of the photonic integrated chip may be comprised in the range from $10^4$ to $2*10^6$, more preferably between $1.5*10^5$ and $1.7*10^6$. This is sufficient for wavelength monitoring in FBG sensor-based structural health monitoring applications which typically require spectral resolutions of the order of 1 pm (e.g. FBG temperature sensors with a temperature resolution of about 1K) to several tens of picometers (e.g. FBG strain sensors with strain resolution of a few tens of µε) for one or more spectral lines in the C-band (1530 nm-1565 nm) to be monitored. Nonetheless, in other embodiments of the invention, the resolving power of the at least one spectrometer of the photonic integrated chip may be less and may be comprised in the range from $10^3$ to $10^4$.

In some embodiments of the invention, the spectral region in which wavelength positions of the at least one spectral line to be monitored and/or the at least one spectral reference line are determined, or determined and tracked, may be at least 1 nm wide, e.g. may comprise at least the range +/−1 nm, e.g. at least +/−3 nm, e.g. at least +/−5 nm, e.g. +/−10 nm. This spectral regions is preferably centered in one of the following optical fiber wavelength bands: O-band, E-band, S-band, C-band, L-band, U-band. Alternatively, this spectral regions may be centered in the visible or in the mid-infrared portion of the electromagnetic spectrum.

The wavelength monitoring device is suitable for use in a Fiber Bragg grating sensing system, in which the wavelength monitoring device is monitoring the wavelength shifts of one or more spectral lines received from the Fiber Bragg grating sensing elements of the system such that the reported monitored wavelength shifts are not affected by a thermal wavelength drift of the integrated optical spectrometer in the wavelength monitoring device.

It is an advantage of embodiments of the invention that wavelength shifts to be monitored can be determined very accurately, especially over short time scales with limited changes in operating temperature (e.g. less than +/−5K) and limited tracking range for the monitored spectral line (e.g. wavelength shifts less than +/−10 nm), for which the monitored wavelength shifts are directly obtainable from previously collected datapoints.

It is an advantage of embodiments of the present invention that the temperature compensation method is a passive spectral method which does not rely on actively controlling the spectral response of the spectrometer.

It is a further advantage of embodiments of the present invention that the PICs, or wavelength monitoring devices comprising PICs according to the invention, do not require a thermometer and are operable in the absence of a thermometer. The related temperature compensation method can be performed without the determination of an operating temperature value for the on-chip spectrometer, although the operating temperature for the on-chip spectrometer can be determined in an optional step.

It is an advantage of embodiments of the present invention that PICs, or wavelength monitoring devices comprising PICs according to the invention, are compatible with a wide variety of technology platforms available for the manufacture of PICs, in particular to those that are concerned with strong optical confinement or suffer from strong thermo-optical coefficients, as for example silicon-based or indium phosphide-based platforms. Carrying out the steps of the related temperature compensation method does not depend on a specific platform.

It is an advantage of embodiments of the present invention that good temperature-compensated wavelength monitoring can be achieved and that accurate wavelength monitoring over the application-specific spectral range can be guaranteed for a wide range of temperatures including realistic outdoor temperature variations.

It is an advantage of embodiments of the present invention that additional processing steps directed at the application of waveguide materials or cladding materials with negative thermo-optic coefficient can be avoided. Nevertheless, the use of materials with negative thermo-optic coefficient is not excluded in embodiments of the present invention, which can be combined with athermal on-chip spectrometer or filter designs to further improve their achievable temperature insensitivity.

It is an advantage of embodiments of the present invention that processing-related deviations from nominal values for waveguide geometries are supported, also on a wafer level, within the fabrication tolerances that are typically encountered for silicon-on-insulator (SOI) PICs.

It is an advantage of embodiments of the present invention that reasonably expectable temperature gradients forming on the PIC can be accounted for without exceeding the predetermined level of accuracy according to which wavelengths are monitored.

It is an advantage of embodiments of the present invention that in a wafer-scale calibration method, the calibration can be limited to few PICs of the wafer, thereby obtaining an accelerated calibration method after wafer-scale manufacture of PICs according to embodiments of the invention.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
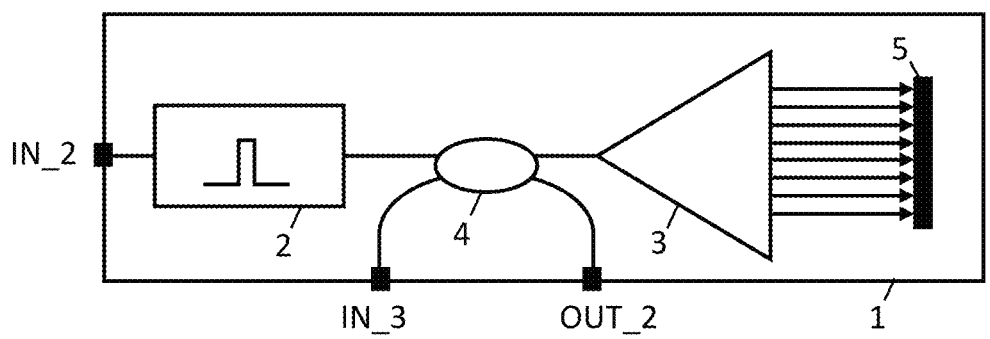
FIG. 1 shows a photonic integrated chip according to an embodiment of the invention, comprising a single spectrometer.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in the description reference is made to radiation or radiation signals, radiation in the form of light as part of the electromagnetic spectrum is meant. This includes in particular light in the UV, visible, near-, mid-, and far-infrared spectrum.

A "photonic integrated chip" or "PIC", in the context of the present invention, refers to a compact, generally strongly miniaturized device which is also suitable for mass production and further integration into larger devices or device assemblies. The PIC comprises light-processing circuitry including various photonic components and interconnects, such as waveguides, integrated detectors, integrated light sources, etc., on a single chip. Photonic components and interconnects of the PIC are frequently patterned on or into a substrate of the chip, or are firmly adhering to a surface of the chip. A PIC is well-suited for the integration of additional devices that do not form part of the light-processing circuitry onto the single chip, for instance control electronics or readout electronics cooperating with the light-processing circuitry to form a single compact, functional device. The PIC is usually provided as a photonic circuit die or planar lightwave circuit and obtained as a portion of a larger wafer which has been diced, cut, sliced, or otherwise divided into smaller pieces.

A spectral line to be monitored or serving as a reference refers to a characteristic spectral feature in the total input spectrum that is received by a wavelength discriminating optical spectrometer, which spectral feature shares the properties of a spectral line. This means a line strength (e.g. maximum amplitude or area under curve), line shape (e.g. Lorentzian, Gaussian, Voigt, Fano), line center (e.g. center or mean wavelength), and a line width can be determined for the spectral line to be monitored or serving as a reference. In particular, when referring to a spectral line to be monitored or serving as a reference, this includes the cases of a positive spectral line (e.g. a transmittance peak) superimposed on a weaker background signal (e.g. noise floor) as well as of a negative spectral line (e.g. a transmittance dip) in respect of a broader elevated signal level.

A thermal drift or drift of a spectral feature in the spectral/wavelength domain such as a spectral line, a wavelength, or wavelength band, all refer to the observable and measurable phenomena of a relative displacement of the transfer characteristic of a photonic integrated device such as wavelength filters or spectrometers with changes in the device operating temperature, often caused by a change in temperature of the whole chip/substrate. This is a physical consequence of the thermo-optic effect (and also thermal dilation or contraction effects) inherent to the waveguiding material, which leads to an increase or decrease of the accumulated optical phase or phase differences as a function of temperature. Depending on the sign of the thermo-optic coefficient, accumulated optical phase or phase differences being positive or negative.

A thermal wavelength drift rate, in contrast to the thermal drift as an absolute wavelength shift, refers to the measured amount of wavelength shift (e.g. a difference in wavelengths caused by a temperature variation) in relation to a measured quantity of temperature change. In particular, the instantaneous drift rate refers to the differential form $d\lambda/dT$ that is typically used to express the thermal wavelength drift rate in phase-sensitive optical devices with non-zero thermo-optic coefficient $dn/dT$.

The thermal wavelength drift of an optical device that selects, rejects or transmits a wavelength component or wavelength band from a broader wavelength range in the input spectrum at a reference temperature constitutes a well-defined and measurable quantity. It can be determined with respect to the input spectrum as the amount of wavelength tuning that is necessary to apply to a source emitting radiation at the wavelength component or band to reproduce the selection, rejection or transmission of the wavelength component or wavelength band by the optical device when supplied with the emitted radiation of the source and operated at a temperature different from the reference temperature. Alternatively, it can be determined with respect to the device output spectrum as the amount of wavelength shift that is observable in the spectral curve recorded by an optical spectrometer connected to the optical device to receive the selected, rejected or transmitted wavelength component or wavelength band when supplied with radiation encompassing a broader wavelength range and operated at a temperature different from the reference temperature.

The resolving power R of a spectrometer such as a grating is generally defined as the ratio of the wavelength of a spectral line to the spectral resolution of the spectrometer, the spectral resolution describing the minimum wavelength difference of two nearby spectral lines that are still distinguishable: $R=\lambda/\Delta\lambda$. In the context of the present invention, the spectral resolution of the spectrometer determines the accuracy to which the wavelength position of a narrow spectral line can be determined in a resolution-limited measurement (e.g. linewidth of the spectral line much smaller than the spectral resolution). The spectral resolution of the spectrometer also determines the minimum detectable shifts in wavelength position over time of a spectral line that is monitored by the spectrometer. The accurate determination of incremental wavelength position changes can be of importance in wavelength monitoring applications such as structural health monitoring.

When in various embodiments of the invention reference is made to spectrometer output channels, this relates to wavelength channels defined in respect of the spectrometer spectral response curve which are also configured for readout. There may be more wavelength channels defined than read out, in which case the number of spectrometer output channels is inferior to the number of spectrometer wavelength channels.

To "monitor" or to "interrogate" a spectral line refers to the same act and is used interchangeably in the description hereinbelow, e.g. a "monitored" or an "interrogated" spectral line are meant to relate to the same entity.

FIG. 1 is a schematic of a photonic integrated chip (PIC) in accordance with an embodiment of the invention, e.g. a chip comprising circuitry for the processing of radiation signals, which circuitry is built from various photonic components and interconnects such as waveguides, integrated detectors, integrated light sources, etc., all provided on a single chip. The circuitry of the photonic chip 1 is allowing for temperature-compensated wavelength monitoring as described further below and comprises a first spectrometer 3, an optical filter 2 and photodetector array 5. An output of the optical filter 2 is optically connected to an input of the first spectrometer 3. Each output waveguide of the first spectrometer 3 that is associated with an output channel of the spectrometer spectral response curve (i.e. the transfer characteristic in the spectral domain) is connected to a photodetector element of the photodetector array 5 to detect the presence and strength of a radiation signal which lies in the output channel.

In the PIC 1 of the present embodiment, an input radiation signal may be received at an input connector 'IN_2', e.g. an optical fiber grating coupler or facet of a tapered waveguide structure, and is transmitted to the optical filter 2 for filtering. A generic optical filter 2 is functionally defined by the filtering operation it performs on the received input radiation signal, which filtering operation is adequately described by the spectral response (curve) or spectral transfer characteristic of the optical filter. In accordance with embodiments of the invention, the spectral response curve of the optical filter 2 provides at least one reference line that is suitable for accurate monitoring by the first spectrometer 3. This implies that the optical filter 2 and the first spectrometer 3 are interrelated and cannot be designed independently from each other. Large spectral gaps between neighboring output channels of the first spectrometer 3 spectral response curve, for instance, would lead to a signal loss and also to an inaccurate position determination of the at least one reference line. In embodiments of the invention, the at least one spectral reference line provided by the optical filter therefore overlaps the wavelength band associated with at least one output channel of the first spectrometer. Furthermore, a free spectral range (FSR) of the first spectrometer has to be selected such that it accommodates the at least one spectral reference line (e.g. one or several spectral reference lines) without ambiguity over the whole range of temperatures for which compensation of the first spectrometer's thermal wavelength drift is striven for, e.g. over +/−20 degree C. or more, e.g. over +/−50 degree C. Structurally, the optical filter 2 may consist of a single optical element or structure, e.g. the optical filter 2 may be provided as a (micro-)ring resonator, Fabry-Perot cavity (e.g. using reflecting surfaces or distributed Bragg reflectors), co-directional or contra-directional grating-assisted couplers, etc. Alternatively, the optical filter 2 may be composed of two or more individual filter structures, e.g. the optical filter 2 is a higher-order filter synthesized from one or few basic components. Non-limiting examples for a composed optical filter include, among others, coupled resonator optical waveguides (CROWs), lattice filters built from Mach-Zehnder interferometers, coupled photonic crystal cavities, as well as combinations of optical filters forming a larger optical filter 2, e.g. two connected optical filters in series, e.g. a multi-peaked filter serially connected to a bandpass filter for selecting one or more of the multiple peaks, e.g. a ring resonator serially connected to a grating-assisted directional coupler for broadband operation.

By way of example, the optical filter 2 is provided as an add-drop ring resonator structure and multiple reference lines, which are receivable from the add port waveguide, are constituted from the multiple transmittance peaks on the ring resonator spectral response curve for the add-port if the filtered input signal is a broadband signal spanning at least one free spectral range of the ring resonator. In a variant of this example, the optical filter 2 is provided as an add-drop ring resonator structure optically coupled in series with a bandpass filter, e.g. a bandpass filter of an on-chip or off-chip broadband source limiting the emission bandwidth of the source and connected to an input port of the ring resonator structure, and/or an on-chip bandpass filter (e.g. a contra-directional Bragg-grating assisted coupler) connected to the add-port of the ring resonator structure. According to this variant, the number of transmittance peaks on the ring resonator spectral response curve for the add-port, and thus the number of reference lines received by the first spectrometer 3, is selectable via the bandpass filter spectral position and spectral width of the passband. The optical filter can further be a tunable filter, e.g. the wavelength position(s) of the at least one reference line is adjustable as may be the number of reference lines or the spectral width of each reference line.

The response signal of the optical filter 2, i.e. the filtered input radiation signal, is sent from an output waveguide of the optical filter 2 past an optical combiner structure 4 to an input waveguide of the first spectrometer 3. The optical combiner structure 4, e.g. a 2×2 directional coupler or a 2×2 MMI filter, conveniently provides a second access pathway to the first spectrometer 3, e.g. via an access waveguide connected between an input connector 'IN_3' and the one input port of the combiner structure 4 which is not occupied by the output waveguide of the optical filter 2. A further radiation signal can thus be input to the photonic chip 1 via the input connector 'IN_3' and received by the first spectrometer 3, such that the further radiation signal is not affected by the filtering action of the optical filter 2, e.g. is not subject to a spectral reshaping as dictated by the optical filter's transfer characteristic/spectral response curve. Alternatively, the further radiation signal may be delivered directly to another, distinct input waveguide of the first spectrometer 3, in which case an optical combiner structure 4 is not necessary. Notwithstanding that only a single input waveguide of the first spectrometer 3 is depicted in FIG. 1, embodiments of the invention are not limited thereto and more than one input waveguide may be present at the first spectrometer 3. Moreover, the optical combiner structure 4 offers the possibility of probing the filter response signal (e.g. for testing or characterization purposes in relation to the optical filter) by collecting a radiation signal off-chip or on-chip from a waveguide connected between the one output port of the combiner structure 4 which is not occupied by the input waveguide of the first spectrometer 3 and an output connector 'OUT_2'. In embodiments of the invention described hereinunder, the input radiation signal and the further radiation signal, receivable by the optical filter and the first spectrometer respectively under operating conditions of the PIC, generally correspond to at least one spectral reference line and at least one monitored spectral line respectively.

The first spectrometer 3 is adapted for spatially separating individual wavelength components or bands of wavelengths that are initially comprised by one or more radiation signals respectively applicable to the one or more input waveguides of the first spectrometer 3, in which they are spatially superimposed. Individual wavelength components or bands of wavelengths are typically dispersed in space by exploiting the effects of refraction or diffraction. For instance, the first spectrometer 3 may be a diffractive device which generates a multi-beam interference pattern on an imaging surface distant from the diffractive structure, e.g. a grating structure. Repeatedly occurring interference maxima of the interference pattern are spread over a distance on the imaging surface to facilitate the separation of the wavelength component or bands responsible for each interference maxima by spatially filtering, by one or more apertures, portions of the interference pattern which correspond to intensity maxima on the imaging surface. Integrated optical spectrometers have the advantage that they can be implemented in a compact form, free of moving parts. In contrast to a movable grating or aperture generally used for wavelength scanning in bulk optical spectrometers, a non-moving etched grating structure or arrayed grating structure can be used in integrated optical spectrometers in combination with waveguide apertures arranged at fixed positions.

Figure 4:
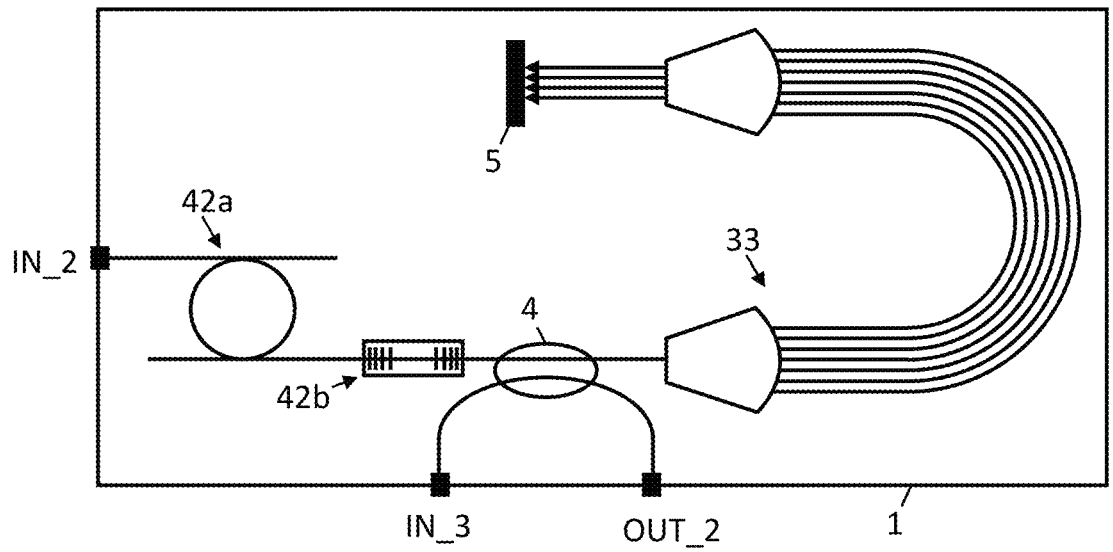

By way of example, the first spectrometer of the PIC in FIG. 4 is provided as an arrayed waveguide grating 33 (AWG) which comprises an array of waveguides of increasing propagation length. Between two adjacent waveguides of the array the increase in propagation length is often determined in such a way that the resulting optical path difference for a reference wavelength (e.g. center wavelength) is an integer multiple of $2\pi$. The array of waveguides is extending between and abutting two free-propagation slab regions (e.g. star couplers) for coupling radiation signals from any of the spectrometer input waveguides to the waveguides of the array and from the waveguides of the array to the spectrometer output waveguides, respectively. Preferably, the spectrometer input and output waveguides as well as the array waveguides, in accordance with the Rowland (mounting) configuration known in the field of spectrometers, are arranged on circular arcs in respect of the boundaries defining the slab regions. An output aperture is provided inherently with each spectrometer output waveguide end face connected to the slab region at the output side, and the apertures are spaced along the slab region boundary, i.e. the imaging plane, at positions which correspond to a calculated lateral displacement of the focal spot for the reference wavelength per unit change of wavelength and predetermined wavelength channel spacing $\Delta\lambda$, e.g. as given by $L_{slab} \cdot d\theta/d\lambda \cdot \Delta\lambda$, wherein $d\theta/d\lambda$ is the angular dispersion of the AWG, $L_{slab}$ the longitudinal dimension (length) of the output slab region. In consideration thereof, a spatially separated output channel and related wavelength band of the optical AWG spectrometer 33 is associated with each output waveguide connected to the output slab region and the wavelength bands in adjacent output channels are separated in the wavelength spectrum by an amount $\Delta\lambda$. It is observed that, according to some embodiments of the invention, the input apertures of spectrometer input waveguides abutting the input slab region may be selected to be different than the output apertures of spectrometer output waveguides abutting the output slab region, e.g. may be selected to be larger by using a larger waveguide cross-sectional area for the input waveguides in comparison to the output waveguide. A magnification factor for the focal spots on the image plane is influenced by this aperture ratio; an input/output aperture ratio exceeding one (e.g. about three or more, e.g. about five) is of advantage if a well-controlled spectral overlap region between adjacent spectrometer output channels is aimed at, e.g. if the skilled artisan aims at the implementation of a center-of-mass detection approach for improving the wavelength position determination accuracy. In the embodiment referring to FIG. 4, the first AWG spectrometer 33 is further coupled to the optical filter via the combiner structure 4; the optical filter comprises a (micro-) ring resonator structure 42a and a bandpass filter structure 42b based on distributed Bragg reflectors. The add-port waveguide of the ring resonator structure 42a is connected to the bandpass filter structure 42b to select a number of transmittance peaks (e.g. one or more peaks, e.g. two or three peaks) when the ring resonator structure 42a is supplied with a broadband radiation input signal, e.g. at the input connector 'IN_2'.

More precisely, an input radiation signal for optical filtering is received by the ring resonator 42a structure at a first one of two bus waveguides that are side-coupled to the ring waveguide. The second one of two bus waveguides couples out and propagates the filtered input signal, e.g. provides the filter response signal at the add port. The filter response signal at the add port of the ring resonator structure 42a for a broad input spectrum is characterized by a sequence of narrowly peaked wavelength ranges, which are centered at the corresponding sequence of resonant wavelengths for the ring structure 42a. This reflects the transfer characteristics or spectral response curve of the ring structure 42a, which comprises regions of high transmittance only in narrowly peaked regions over the wavelength spectrum. Successive transmission peaks are separated by a free spectral range (FSR) of the ring structure 42a. To limit the number of transmitted peaks to one that is practically relevant, the bandpass filter 42b selects at least one peak, e.g. selects several of the transmitted peaks, e.g. selects two or three peaks. For instance, the bandpass filter 42b is designed to suppress or filter out those transmittance peaks for the spectral response curve of the ring resonator structure 42a which lie outside the free spectral range of the first spectrometer 33. Additionally, the bandpass filter 42b may limit spectral crowding by selecting only one or several transmittance peaks within one FSR of the first spectrometer 33, e.g. near the end portions of the spectral response curve of the first spectrometer 33 (e.g. at or next to the first and last channel), or near the end portions and some intermediate portions. This has the advantage of extending the useable spectral range for wavelength monitoring as collisions or overlap is reduced. Hence, also the dynamic range for wavelength monitoring is increased. Moreover, the add-configuration of the ring resonator structure 42b allows for the detection of high signal levels, e.g. peaks instead of dips, which are easier and more reliably detected in the presence of a noise floor.

Figure 3:
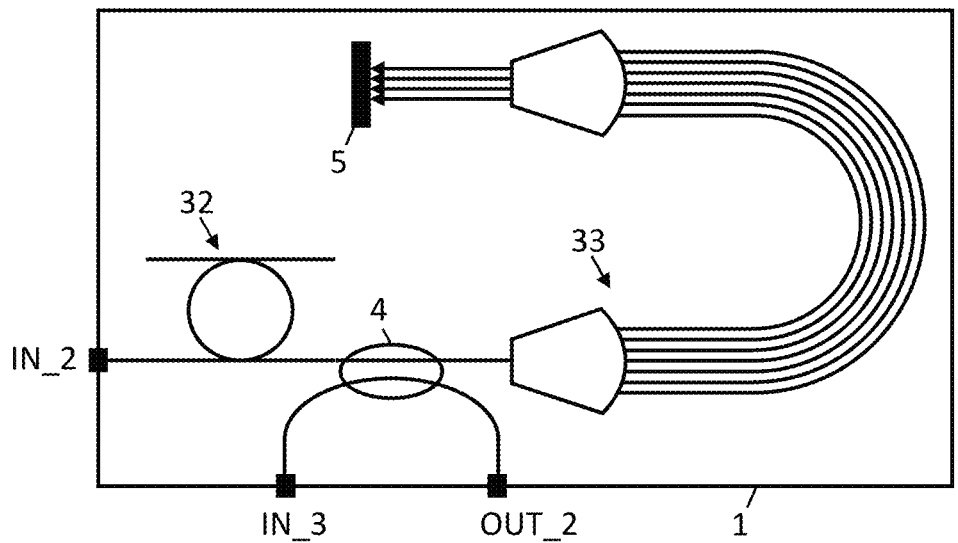
FIG. 3 and FIG. 4 show photonic integrated chips according to particular embodiments of the invention, in which the first spectrometer is provided as an arrayed waveguide gratings and the optical filter comprises a ring resonator structure.

Referring briefly to FIG. 3, a variant of the embodiment described in reference to FIG. 4 is shown. In this variant, the optical filter comprises a ring resonator structure 32, but not a bandpass filter structure. This optical filter implementation, which is more compact, is typically making the assumption of receiving a bandwidth-limited input radiation signal, e.g. a broadband radiation signal emitted by a source (e.g. SLED) that has been pre-filtered by a bandpass filter before being fed into the PIC 1. Moreover, this variant provides the ring resonator structure 32 in the drop-configuration, i.e. the at least one reference line provided by the ring resonator structure 32 corresponds to a transmittance dip that is superimposed on a broader elevated signal level.

However, nothing prevents the skilled person to provide the ring resonator structure 32 of this variant in the add-configuration.

Figure 2:
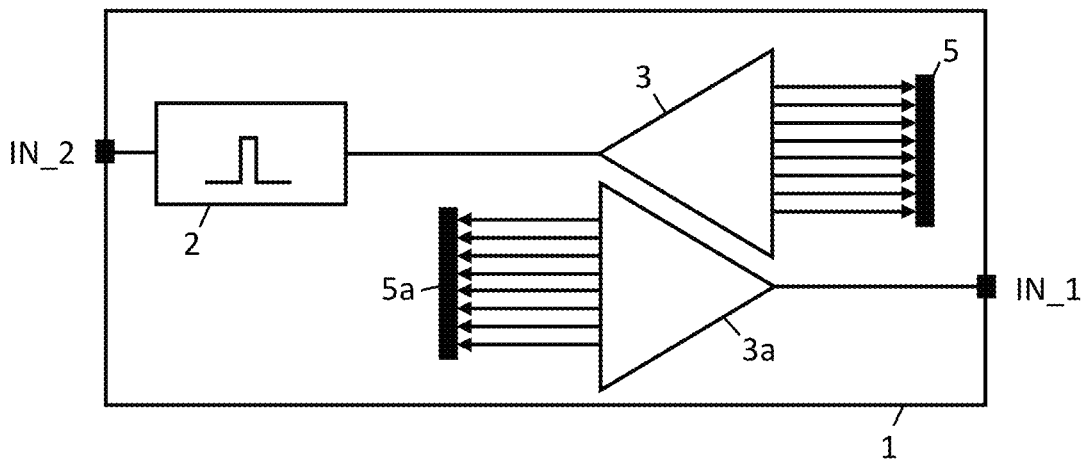
FIG. 2 shows a photonic integrated chip according to an alternative embodiment of the invention, comprising two separate spectrometers.

With reference to FIG. 2, a PIC 1 according to a different embodiment of the invention is shown. The PIC 1 comprises an optical filter 2, a first spectrometer 3, and a further (second) spectrometer 3a. The optical filter 2 may be a combination of ring resonator structure, Fabry-Perot cavity, or similar, for providing a plurality of spectral reference lines, and a bandpass filter serially connected thereto for selecting at least one reference line among the plurality of reference lines. The optical filter 2 is configured to receive a radiation signal comprising a wavelength continuum as filter input signal, e.g. via the input connector 'IN_2'. In some embodiments of the invention, the first and the second spectrometers 3, 3a are substantially identical spectrometers, e.g. are designed according to identical design parameters and varying only within fabrication tolerances. For instance, the first and second spectrometer 3, 3a are provided as identical AWGs, e.g. two AWGs with a same number of spectroscopic output channels, a same output channel spacing and shape, a same type of array waveguides, etc. In other embodiments of the invention, however, the first spectrometer 3 may be different from the second spectrometer 3a, e.g. two AWGs with different output channel shapes or one AWG and one echelle grating. An output of the optical filter 2 is directly connected to an input of the first spectrometer 3 to supply the at least one spectral reference line, and outputs of the first spectrometer 3 are connected to an array 5 of photodetector elements. The spectral line that is monitored is directly applicable to an input of the second spectrometer 3a, e.g. via another input connector 'IN_1', and the outputs of the second spectrometer 3a are connected to another array 5a of photodetector elements 5a. It is an advantage of this particular embodiment that the two spectrometers 3, 3a can be designed independently and according to different specifications. For example, the first spectrometer 3 for interrogating the at least one spectral reference line may have a finer resolution bandwidth (e.g. finer AWG channel spacing), and thus higher resolving power R, than the second spectrometer 3a for a same number of spectrometer output channels. Hence, an accurate compensation of the thermal wavelength drift related to the second spectrometer 3a is achieved in addition to an extended wavelength tracking range available for the first spectrometer 3, which supports tracking of multiple reference lines and/or tracking of the at least one reference line over a larger predetermined temperature range. Moreover, providing two separate spectrometers 3, 3a circumvents the problem of preventing spectral ranges occupied by the monitored spectral line(s) and the at least one reference line in a single spectrometer to collide or overlap in the predetermined temperature range and wavelength range for monitoring. Although the surface area of the PIC occupied by two spectrometers is larger than for the single spectrometer case, the spectrometers can be provided in a compact form (e.g. two AWGs sharing the same slab regions) and close to each other, which minimizes the impact of temperature gradients on the corrected wavelength position for the monitored spectral line.

In embodiments of the invention, the first spectrometer 3, 33 as well as the further spectrometer 3a, if provided, may have their spatially separated wavelength components or wavelength bands directed to a plurality of photodetector elements or, alternatively, to a plurality of distinct detection regions of a same photodetector for detecting a signal level or signal strength (e.g. an intensity level and/or an energy level) for each of the wavelength components or wavelength bands separated by the first spectrometer. For instance, one or more spectrometer output waveguides, e.g. all the spectrometer output waveguides associated with an output channel of the first spectrometer that is used for wavelength monitoring, are propagating the radiation at/within the respective wavelength component/band toward an array of photodetector elements 5. Such an array of photodetector elements may be provided as an on-chip photodetector array, e.g. a plurality of integrated Ge, SiGe, or InGaAs photodiodes coupled to a corresponding plurality of output waveguides of the first spectrometer, or as an off-chip photodetector array, e.g. a linear array of photodetector elements. In both cases, additional light extraction means may be provided on or within those spectrometer output waveguides that are associated with spectrometer output channels used for wavelength monitoring, thereby assisting in diverting radiation at the respective wavelength component/band from the spectrometer output waveguide to the corresponding photodetector element. Non-limiting examples of such additional light extraction means may include waveguide grating structures (e.g. grating couplers with or without a connected array of optical fibers), waveguide tapering structures, overlay waveguide structures, antireflection coatings applied on waveguide facets, etc. Moreover, providing different pixel locations of a same photosensitive camera, screen, or film, may also allow for a position-dependent detection of each wavelength component/band separated by the first spectrometer. The previous considerations with regard to the detection of signal levels of the wavelength components or bands separated by the first spectrometer by means of photodetector elements are applicable to any further spectrometer of the PIC.

Figure 6:
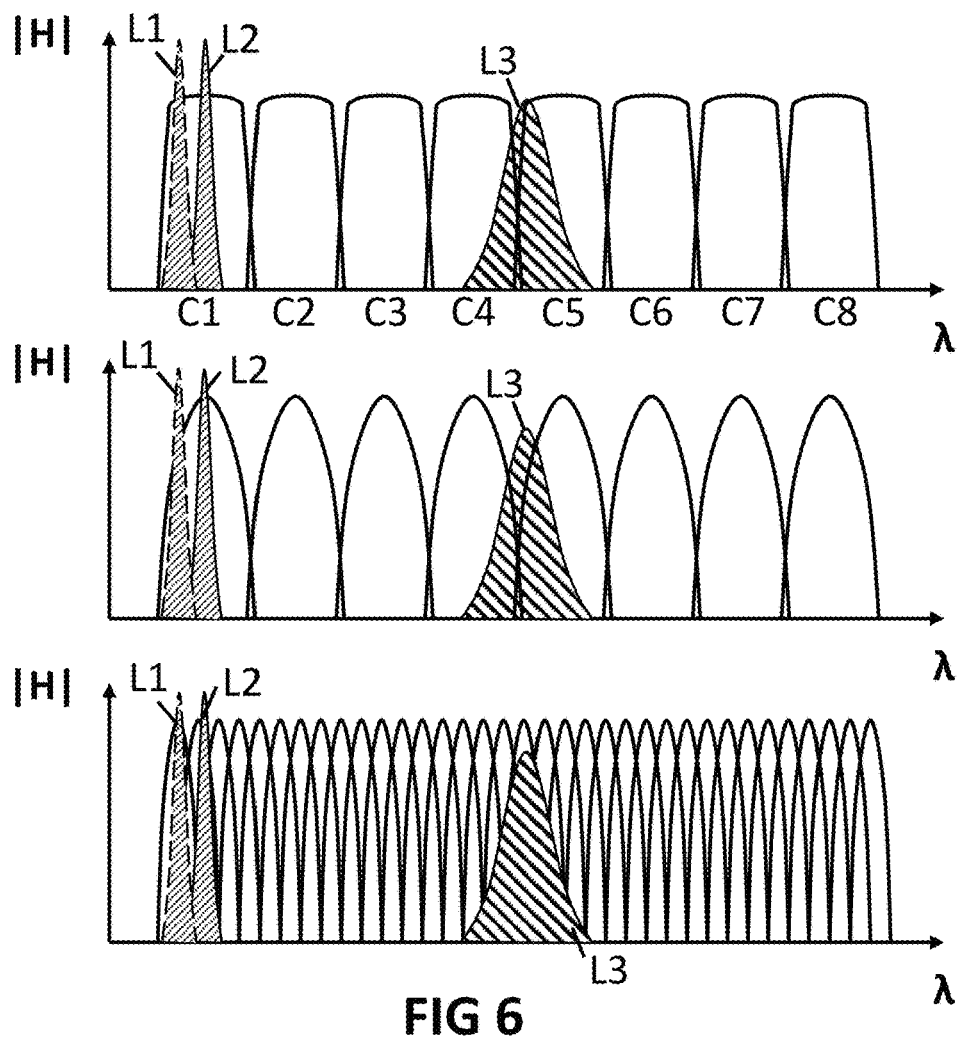
FIG. 6 illustrates examples of possible spectrometer output channel configurations in the spectral response curves of optical spectrometers which can be used in embodiments of the invention.

FIG. 6 illustrates possible spectral response curves, e.g. the transfer characteristics or transmittance curves $|H(\lambda)|$, of three different spectrometer designs (e.g. AWGs) along with three interrogated spectral lines. A flat-top channel design for coarsely spaced spectrometer output channels is shown at the top. The spectral power density of the interrogated lines is thus integrated over the channel bandwidth in a substantially homogeneous way. In consequence, a sharply peaked interrogated spectral line L1 located near the channel edge is detected in the same way as a sharply peaked interrogated spectral line L2 located about the channel center wavelength, that is to say as a dominant signal contribution to that channel also in the presence of noise. Adjacent output channels are only overlapping in a narrow spectral region near their steep edges, which reduces the impact of inter-channel cross-talk noise on the accurate determination of the spectral line center wavelength position. For instance, the third spectral line L3, which is much broader than the other two lines L1 and L2, gives rise to a distribution of detectable signal strengths over a sub-range of spectrometer output channels and a center-of-mass approach is implemented to determine the center wavelength of the broad spectral line L3, e.g. $\lambda_{cen}(L3) = \Sigma_i s_i \lambda_i / \Sigma_i s_i$, with $s_i$ the detected signal strength of the i-th spectrometer output channel and $\lambda_i$ the center wavelength of the i-th spectrometer output channel. If the line shape or profile is known, this a-priori information on the shape can be used to obtain a more accurate determination of the center wavelength of the spectral line L3 by optimizing the confidence in a parametric curve fitting step, e.g. fitting the free parameters of a normalized Lorentzian line shape (center, width) to the signal contributions of the spectral line L3 to each of the channels C3 to C6 (neglecting the signal contributions to the remaining channels). A non-flat, peaked channel design for coarsely spaced spectrometer output channels is shown in the middle. The spectral power density of the interrogated lines is thus integrated over the channel bandwidth in a non-homogeneous way. In consequence, a sharply peaked interrogated spectral line L1 located near the channel edge is strongly affected by the presence of a background noise signal upon detection, e.g. the signal contribution to that channel may be indistinguishable from a noise floor contribution. In such cases the spectral line is still located as a dominant signal contribution to that channel also in the presence of noise if the line strength is increased, e.g. by increasing the output power level of a broadband source which is connected to the optical filter. Nevertheless, the weaker signal contribution to the channel near the edges results in a larger degree of uncertainty on the determined wavelength position of the spectral line L1 (systematic error) as compared to the degree of uncertainty on the determined wavelength position of the spectral line L2 located about the channel center wavelength. The latter yields a stronger signal contribution to the channel and an improved signal-to-noise ratio. Also in this design, the center wavelength of a broader spectral line L3 may be estimated at a sub-channel resolution by applying a linear weighting scheme to the signal strengths detectable in consecutive spectrometer output channels, e.g. determining the center wavelength of the spectral line L3 to be located about half-way between the fourth and the fifth output channel by calculation of a weighted average. Another non-flat, peaked channel design is shown in the bottom for densely spaced spectrometer output channels, e.g. channel spacing less than 200 GHz, e.g. less than 100 GHz, e.g. 50 GHz. Clearly, the denser spacing of adjacent output channels allows for a more accurate determination of the sharply peaked spectral line L1 and L2, for which a peak or dominant signal strength is detectable in two distinct output channels in the bottom design. This is in contrast to the top and middle designs in which the center wavelengths of the closely spaced spectral lines L1 and L2 are not resolved as being located in different wavelength bands of separate output channels but are allocated to a same wavelength band of a single output channel. A particularity of the bottom design is that a controlled spectral overlap region between two or more adjacent output channels allows for the determination of the center wavelength of sharply peaked spectral lines L1, L2 with sub-channel resolution. For instance, the 3 dB bandwidth of the spectrometer output channels is selected to be larger than the output channel spacing such that even in the limit of an infinitely narrow interrogated spectral line more than one spectrometer output channel will detect a signal contribution, e.g. the signal strength of the infinitely narrow interrogated spectral line is distributed over three or more neighboring spectrometer output channels, e.g. over five neighboring spectrometer output channels. This is in contrast to the top and middle designs, in which the signal strength of an infinitely narrow interrogated spectral line is detectable only in one spectrometer output channel, regardless of the output channel bandwidth, because adjacent spectrometer output channels are essentially free of spectral overlap to minimize inter-channel crosstalk. Therefore, the center wavelength of sharply peaked spectral lines L1, L2 may be determined as a center-of-mass coordinate, $\lambda_{cen} = \Sigma_i s_i \lambda_i / \Sigma_i s_i$, in this third design to obtain sub-channel accuracy. Introducing spectral overlap among multiple adjacent spectrometer output channels for integrated on-chip AWGs using multi-channel weighting techniques to allocate a center wavelength to a spectral line which is monitored by the AWG allows for read-out wavelength accuracies at the picometer level, i.e. resolving powers about one million or larger. Prior knowledge about potentially distorted output channel shapes, deviating from a Gaussian shape for example, may be obtain through spectrometer characterization with a swept laser source and the output channel spectral position $\lambda_i$ can be corrected, e.g. as the wavelength within the output channel which corresponds to 50% of the area under the output channel curve.

From the foregoing description it is clear that the first spectrometer 3, or any further spectrometer of the PIC 1 without especially referring thereto hereinafter, is configured for detecting wavelength shifts in respect of the at least one (e.g. two or more) spectral lines that are monitored. More specifically, the wavelength shifts of the monitored spectral lines are detectable as changes in the detected signal strength distribution, e.g. intensity or energy distribution, over the individual output channels defined for the first spectrometer (the wavelength channels defined in the first spectrometer's spectral response curve) since output channel of the first spectrometer are partially or entirely overlapping with the at least one monitored spectral line whilst shifting. For instance, a monitored spectral line undergoes a wavelength shift during which it moves from one output channel of the first spectrometer spectral response curve to an adjacent output channel. If the monitored spectral line has a spectral width (e.g. linewidth) smaller or equal to the spectral width of the output channel and individual output channels of the first spectrometer are substantially non-overlapping in their spectral bands, then this shift is accompanied by a change in the detected signal strengths for the output channel and the adjacent output channel respectively; the signal strength detected in respect of the output channel at the start of the wavelength shift will continuously decrease and the signal strength detected in respect of the adjacent output channel at the start of the wavelength shift will continuously increase. Therefore, the dominant signal strength contribution may be the criterion based on which, assuming output channels are corrected for non-uniform insertion losses, the center wavelength of the monitored spectral line is assigned to the center wavelength of one of the output channel and the adjacent output channel. Alternatively, the ratio of the signal strength contributions detectable for the output channel and the adjacent output channel, $s_i/s_{i+1}$, is used to assign a wavelength on a channel-to-channel transition curve, i.e. a previously obtained curve for the signal strength ratio between adjacent output channels, to the center wavelength of the monitored spectral line. Likewise, if the monitored spectral line has a spectral width (e.g. linewidth) larger than the spectral width of the output channel, e.g. is overlapping several successive output channels of the first spectrometer, or if neighboring output channels of the first spectrometer are substantially overlapping in their spectral bands, e.g. sharing a common spectral region bounded by the respective 3 dB or 10 dB cutoff points between adjacent channels or sharing a common spectral region bounded by the respective points of intersection between the output channel slopes and a noise floor level, then the wavelength shift of the monitored line is accompanied by a change in a peak signal, a center-of-mass signal, one or more output channel ratios (e.g. between two adjacent output channels $s_i/s_{i+1}$, or between three consecutive output channels $s_{i-1}/s_i$ and $s_i/s_{i+1}$, etc.), or any other suitable signal conveying spectral localization information that is determined from the individually detectable signal strengths in respect of the successive and/or consecutive spectrometer output channels experiencing a spectral overlap with the monitored line whilst shifting. Hence, the determined peak signal, center-of-mass signal, or other suitable signal, will be increasing if the monitored spectral line is shifting toward larger wavelengths and decreasing if the monitored spectral line is drifting toward smaller wavelengths. A non-limiting example for the at least one monitored spectral line is given by the interrogation of at least one reflected line received from a Fiber Bragg sensing system, e.g. one or more spectral lines reflected by Fiber Bragg gratings (FBGs) patterned at various positions into a glass fiber. The interrogated at least one spectral line received from a FBG sensor or sensing system is shifting in wavelength in response to local temperature and/or stress changes at the respective FBG sites where one of the at least one monitored spectral lines is being reflected. An accurate reading of the wavelength shift experienced by the at least one monitored spectral line is crucial for a good temperature and/or pressure sensing performance of the FBG sensor or sensing system.

In addition to its property of being configured for detecting wavelength shifts relating to the at least one spectral line to be monitored, the first spectrometer 3 or 33 of embodiments referred to in FIG. 1, FIG. 3, and FIG. 4, is also configured for detecting wavelength shifts which relate to the at least one spectral reference line provided by the optical filter when filtering an input radiation signal. It is noted that any detectable wavelength shift in respect of the at least one spectral reference line during the wavelength monitoring operation of the PIC, thus not including initial wavelength shifts due to an optional tuning or alignment action of the optical filter (e.g. by integrated heaters or diodes) in some embodiments of the invention, is limited to wavelength shifts that are caused by temperature variations. Moreover, these temperature variations affect both the optical filter and the first spectrometer, e.g. the temperatures for the optical filter and the first spectrometer vary by the same amount or differ by a temperature gradient the maximum value of which is supported by design over the predetermined temperature operating range. It is therefore preferable to shield the optical filter and the first spectrometer from any other physical or chemical interactions, except temperature variations, that could bring about a wavelength shift of the at least one spectral reference line. For instance, it is good practice to apply a chemically inert cladding layer such as thermal silicon oxide to the patterned waveguide structures of the optical filter and the first spectrometer. The detection of the at least one spectral reference line may be performed at the same time as the detection of the at least one monitored spectral line, for instance in cases in which a combiner structure is provided for combining the at least one monitored spectral line and the at least one spectral reference line and applying the combination to an input of the first spectrometer. However, it is also possible to perform the detection of the at least one monitored spectral line and the at least one spectral reference line sequentially, e.g. by using a switchable directional coupler as combining structure or by using additional optical switches on-chip or off-chip to select only one of the at least one monitored spectral line and the at least one spectral reference line at a time. If a continuous monitoring of the monitored spectral line(s) is not strictly required, this sequential detection has the advantage that a possible spectral collision or overlap between the at least one monitored spectral line and the at least one spectral reference line beyond a safe predetermined temperature range and predetermined spectral range available for monitoring can be avoided, whereby an enlarged temperature range and/or an enlarged spectral range available for monitoring is achievable, provided that the operating temperature of the first spectrometer does not fluctuate significantly between two switching events.

Figure 7:
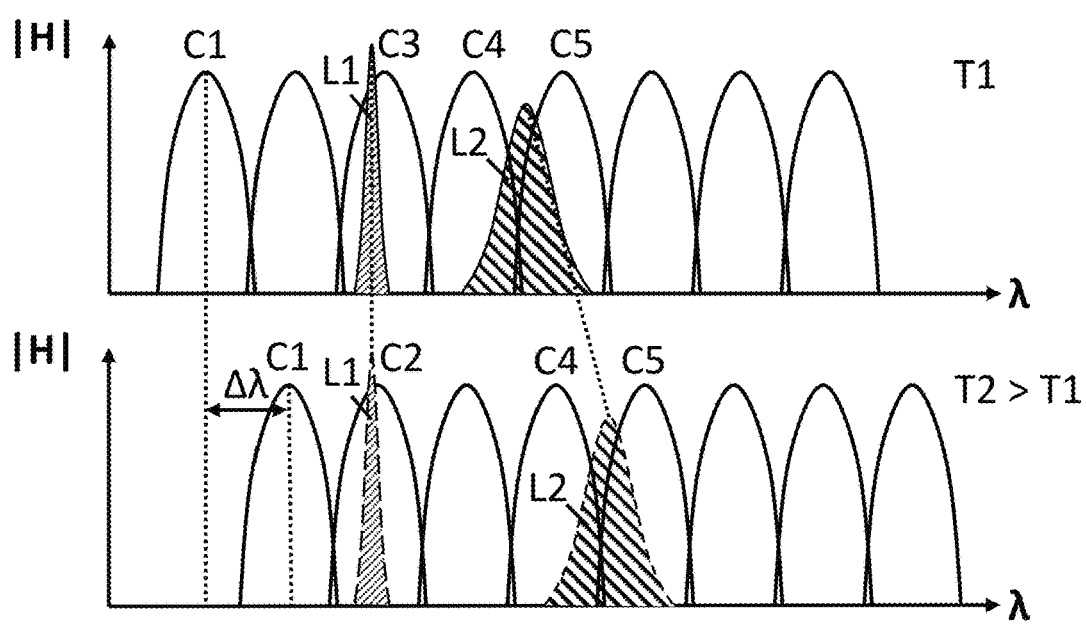
FIG. 7 illustrates an example for a thermal wavelength drift of the spectral response curve of an optical spectrometer as used in embodiments of the invention.

FIG. 7 further explains the effects of a temperature variation occurring during the wavelength monitoring operation of the PIC. The spectral transmittance curves (e.g. response curves) of a spectrometer $|H(\lambda)|$ as a function of wavelength $\lambda$ are shown for a reference temperature T1 in the upper part and for a further temperature T2, larger than the reference temperature T1, in the lower part. As a result of the temperature increase, the additional amount of optical phase accumulated during propagation of radiation through the spectrometer which accounts for the larger effective refractive index (assuming a positive thermo-optic coefficient dn/dT) leads to a spectral drift of the whole response curve, in this particular example a shift towards larger wavelengths. The measurable (wavelength-dependent) thermal wavelength drift for the first spectrometer output channel C1 is denoted $\Delta\lambda$ and the related thermal wavelength drift rate of the spectrometer response curve at the first output channel position with respect to the reference temperature is given as $\Delta\lambda^{(C1)}_{T1\to T2}/(T2-T1)$. It becomes clear from FIG. 7 that the thermal wavelength drift of the spectrometer spectral response curve, including the output channel wavelength positions, is a source of uncertainty concerning the accurate determination of the center wavelength of a monitored spectral line. In this example, a first spectral line L1 that is monitored is a stabilized spectral line not drifting with temperature and therefore positioned at the same absolute wavelength for both temperatures. Nonetheless, there is an apparent movement of the detectable signal strength from the third output channel C3 to the second output channel C2 when the operating temperature of the spectrometer increases from T1 to T2. In the absence of a temperature compensation scheme, the center wavelength of the spectral line L1 will be erroneously assigned to the second channel C2 wavelength position where it should remain assigned to third channel C3 wavelength position if the spectrometers output channel positions are used to reference the center wavelength of the monitored spectral line as it is generally done. Besides, a second spectral line L2 that is monitored leads to a signal strength distribution over the output channels C4 and C5 for both temperatures T1 and T2. Naturally, it would be assigned a center wavelength which is located about halfway (e.g. using adjacent output channel ratios) between the wavelength positions of the fourth C4 and the fifth output channel C5 respectively and there is no apparent wavelength shift detectable in the absence of temperature compensation, although the monitored spectral line L2 happens to shift during the temperature increase.

The details described above demonstrate the center wavelength of a monitored spectral line cannot be uniquely determined by identification with a detectable distribution of the spectral line signal strength over the individual spectrometer output channels alone if temperature variations become a compromising factor. In consideration thereof, the first spectrometer could be operated at a constant temperature if temperature stabilization means by heating or cooling were provided and only then a spectral response curve of the first spectrometer would be free of thermal wavelength drifts caused by temperature fluctuations altogether. However, the elements for controlling and stabilizing temperature by heating or cooling of spectrometer on the PIC consume additional power and may themselves dissipate heat, thereby increasing the spectrometer's operating temperature. Their implementation on chip also require additional processing steps as does the implementation of athermal spectrometers by means of specific materials that exhibit a negative thermo-optic coefficient dn/dT<0. Another drawback of athermal spectrometers using these specific materials is that they are often designed to work at a single target wavelength and deviate from the sought temperature-insensitive behavior at wavelengths away from the target wavelength.

In the event that an optical spectrometer of the PIC is neither specifically designed as an highly accurate athermal device nor equipped with temperature adjustment means, it follows that a temperature compensation method is needed to overcome the lack of temperature insensitivity. A temperature compensation method is also needed if the specifically designed athermal device does not meet the requirements of very accurate wavelength determination set by an applications, e.g. for Fiber Bragg grating-based wavelength monitoring. The PIC according to the invention is specifically adapted for the use in a wavelength monitoring device that carries out a temperature compensation method in that it provides at least one spectral reference line. The at least one spectral reference line is provided by the optical filter as an on-chip reference line and further is received by the first spectrometer for detecting wavelength shifts of the at least one spectral reference line relative to the spectral response curve of the first spectrometer, e.g. relative to the output channels defined with respect of the spectral response curve of the first spectrometer. In view of the foregoing description it would seem natural to provide a stable reference line for this purpose, i.e. a spectral reference line that does not drift upon temperature changes. Given the fact that the optical filter is providing the at least one spectral reference line to the first spectrometer by filtering a broadband input radiation signal according to a spectral response curve of the optical filter and that this spectral response curve of the optical filter also has a thermal wavelength drift associated with it, the skilled person may be led to question the practical utility of the proposed photonic circuit. The skilled person may be even more surprised by the distinctive feature of the PIC, according to which the respective thermal drift rates for the spectral response curves of the optical filter and of the first spectrometer are selected to be substantially different from one another. Selecting the two thermal wavelength drift rates to be different not only causes a thermal wavelength drift of the filtered reference line(s) received by the first spectrometer, but also a relative thermal wavelength drift of the received at least one spectral reference line relative to the thermal wavelength drift for the spectral response curve of the first spectrometer. In the following it is described how the different selection of the two thermal wavelength drift rates is assessed and how that is used to advantage.

Being aware of possible thermal wavelength shifts of the spectrometer receiving the at least one spectral line to be monitored, the skilled person will try to correct the wavelength position of a monitored spectral line obtained by measurement with this spectrometer, $\lambda_{mon}$, to account for the systematic error introduced by the thermal wavelength drift, i.e. by using the correction formula (and assuming negligible wavelength dispersion contributions to the thermal wavelength drift rate)

$$\hat{\lambda}_{mon} = \lambda_{mon} + r_{mon} \Delta T_{mon} \quad (Eq.\ 2)$$

with a previously obtained or estimated constant thermal wavelength drift rate of the spectrometer $r_{mon} = d\lambda/dT|_{mon}$ and a measured value of the temperature change $\Delta T_{mon}$. However, measuring the operating temperature at the site of the spectrometer on the PIC to obtain the temperature change proves to be impractical or even impossible in view of the lack of cheap miniaturized thermometers that can be co-integrated on the same photonic chip in the vicinity of the spectrometer. Hence, the skilled practitioner recognizes that even for a spectrometer with a good resolving power R>>1, the achievable accuracy for the determined wavelength position of the monitored spectral line is ultimately limited by the degree to which temperature variations can be suppressed. If the temperature is varying over time and temperature variations are not suppressed, which is indeed the scenario the present invention is primarily concerned with, then an estimate of the change in operating temperature has to be obtained indirectly such that the systematic error in the correction formula can still be reduced or eliminated. At this point, the thermal wavelength shifts detected with respect to the at least one spectral reference line come in useful, since the change in the operating temperature of the spectrometer to which the monitored spectral line is applied, is substantially equal to the operating temperature of the spectrometer that is receiving the at least one spectral reference line. At present, two cases have to be distinguished: a single spectrometer which is configured for receiving both the at least one spectral line to be monitored and the at least one spectral reference line in the first case and, in the second case, two separate spectrometers which are configured for receiving the at least one spectral line to be monitored and the at least one spectral reference line, respectively. Regarding the first case, a single temperature change $\Delta T = \Delta T_{mon} = \Delta T_{ref}$ is to be used in the equations (Eq. 1) and (Eq. 2) for a single spectrometer. In the second case, however, the temperature change of the first spectrometer $\Delta T_{ref}$ and the temperature change of the further spectrometer $\Delta T_{mon}$ could in principal be different if a small temperature gradient exists between the respective spatial locations of the first and further spectrometer on the PIC. It is reasonable to assume that the operating temperatures for the two spectrometers are equal if they are located close to one another in a same region of the PIC, especially in embodiments in which a substrate material of the PIC comprises a good thermal conductor (e.g. silicon) or is in physical contact with such a good thermal conductor (e.g. a thermally conductive paste provided at the backside of the substrate). For the same reason, the operating temperature of the optical filter is, in good approximation, identical with the operating temperature of the first spectrometer. Deviations from this assumption, e.g. the existence of a finite temperature gradient between the two spectrometers or between the optical filter and the first spectrometer, can be taken into account and one way of dealing with temperature gradients is presented further below. As a result, the following expression in equation (Eq. 3a) for the corrected, e.g. temperature-compensated, monitored wavelength position is obtained under the assumption of equal operating temperatures and constant thermal wavelength drift rates $r_{mon}$, $r_{ref}$ (e.g. applicable in spectrally narrow ranges in which no significant errors are introduced). The expression in equation (Eq. 3b) is derived by integration of (Eq. 3a) in the limit of infinitesimal temperature and wavelength differences and taking non-negligible dispersion effects, i.e. wavelength-dependent drift rates $r_{mon}(\lambda)$, $r_{ref}(\lambda)$, into account. More specifically, thermal wavelength drift rates $r_{mon}(\lambda)$, $r_{ref}(\lambda)$ are assumed to vary linearly with wavelength (cf. Eq. 1) for a constant group refractive index $n_{g,mon}$ and $n_{g,ref}$ and constant thermo-optic coefficient $TO_{mon} = dn_{mon}/dT$ and $TO_{ref} = dn_{ref}/dT$, respectively. It is easily verified that equation (Eq. 3b) reduces to equation (Eq. 3a) in the limit of small thermal wavelength drifts $\Delta\lambda_{ref}$, $\Delta\lambda_{mon}$ (e.g. small enough to have approximately constant thermal wavelength drift rates).

$$\hat{\lambda}_{mon} = \lambda_{mon} + \Delta\lambda_{ref} \frac{r_{mon}}{r_{ref}} \quad \text{(Eq.3a)}$$

$$\Delta T_{ref} = \Delta T_{mon} \stackrel{(Eq.1)}{\Rightarrow} \frac{\Delta\lambda_{ref}}{\lambda_{ref}} \frac{n_{g,ref}}{TO_{ref}} = \frac{\Delta\lambda_{mon}}{\lambda_{mon}} \frac{n_{g,mon}}{TO_{mon}}$$

$$\int_{\lambda_{mon}}^{\hat{\lambda}_{mon}=\lambda_{mon}+\Delta\lambda_{mon}} \frac{d\lambda'_{mon}}{\lambda'_{mon}} = \frac{TO_{mon}}{TO_{ref}} \frac{n_{g,ref}}{n_{g,mon}} \int_{\lambda_{ref}}^{\lambda_{ref}+\Delta\pi_{ref}} \frac{d\lambda'_{ref}}{\lambda'_{ref}}$$

$$\hat{\lambda}_{mon} = \lambda_{mon}\left(1 + \frac{\Delta\lambda_{ref}}{\lambda_{ref}}\right)^{\frac{TO_{mon}^n g,ref}{n_{g,mon}TO_{ref}}} = \lambda_{mon}\left(1 + \frac{\Delta\lambda_{ref}}{\lambda_{ref}}\right)^{\frac{r_{mon}(\lambda_{mon})\lambda_{ref}}{\lambda_{mon} r_{ref}(\lambda_{ref})}} \quad \text{(Eq.3b)}$$

The second equality in (Eq. 3b) has been obtained via the relationship $r(\lambda)/=TO/n_g$ of (Eq. 1). Using the fact that the thermal wavelength drift rate for a spectral reference line $r_{ref}$ is an apparent drift rate, which is the outcome of the superimposition of two independent thermal drift rates, the thermal wavelength drift rate of the spectral response curve of the optical filter, $r_{opt}$, and the thermal wavelength drift rate of the spectral response curve of the spectrometer relative to the received spectral reference line, $-r_{spec}$, equation (Eq. 3a) is rewritten in the following way.

$$\hat{\lambda}_{mon} = \lambda_{mon} + \Delta\lambda_{ref} \frac{r_{mon}}{r_{opt} - r_{spec}} \quad \text{(Eq.4)}$$

The same substitution can be performed in equation (Eq. 3b). Inspection of equation (Eq. 4) shows temperature-compensated monitored wavelength position $\hat{\lambda}_{mon}$ critically depends on the thermal drift rate difference in the denominator. This inverse relationship implies that an accidental or unintended small difference between the thermal wavelength drift rates for the spectral response curves of the optical filter and the spectrometer dramatically influences the result of the temperature compensation, i.e. strongly contributes to the systematic error which limits the maximally achievable accuracy for the corrected monitored wavelength position. This is further confirmed by performing an error analysis with respect to equation (Eq. 4) using the first-order propagation of measurement errors and assuming no correlation between the measured variables. Defining the relative error of the measurement result as $\delta_{mon}=\sigma(\lambda_{mon}')/\lambda_{mon}$ with standard deviation $\sigma$, the following estimation of equation (Eq. 5) is derived, in which $\delta(r_{mon})$ and $\delta(D)$ are the relative errors for the thermal drift rate of the spectrometer that is receiving the monitored spectral line and for the (absolute) thermal drift rate difference $D=|r_{opt}-r_{spec}|$ respectively.

$$\delta_{mon} \approx \sqrt{1 + \left(R_{mon}\frac{\Delta\lambda_{ref}}{\lambda_{mon}}\frac{r_{mon}}{D}\right)^2\left[\left(\frac{1}{R_{ref}}\right)^2 + \delta(r_{mon})^2 + \delta(D)^2\right]}/R_{mon} \quad \text{(Eq.5)}$$

$$\delta_{mon} \approx 1/R_{mon,eff}$$

There are various contributions to the overall error in the equation (Eq. 5) above, which all have the effect of reducing the effective resolving power $R_{mon,eff}$ of the spectrometer configured for receiving the at least one monitored spectral line. Nonetheless, it is observed that the relative error $\delta_{mon}$ can be controlled by a careful selection of the thermal wavelength drift difference D. In the light of equation (Eq. 1) dealing with thermal wavelength drifts, embodiments of the invention enable the purposeful selection of the thermal wavelength drift difference D by adapting the geometry and cross-sectional size in the waveguides comprised in the optical filter and the first spectrometer respectively, by selecting the waveguide core and cladding materials according to their thermo-optic properties, by effective (group) index engineering (e.g. waveguides with longitudinal sub-wavelength features), and/or by providing interface layers with stress absorbing or stress generating properties.

By way of example, there are situations in which the relative error contributions of the thermal drift rates and thermal drift rate differences are neglectable in view of the dominating contribution by the resolving power of the first spectrometer $R_{ref}$, e.g. for relatively large spectrometer output channel spacings. In such a situation it is preferable to reduce the error term under the root, i.e.

$$\left(\frac{R_{mon}}{R_{ref}}\frac{\Delta\lambda_{ref}}{\lambda_{mon}}\frac{r_{mon}}{D}\right) \ll 1,$$

otherwise the effective resolving power of the wavelength monitoring spectrometer $R_{mon,eff}$ will decrease by a factor square root of two as soon as the mentioned error term under the root approaches one. In this example a possible criterion for controlling the relative error $\delta_{mon}$ may be formulated in terms of the maximally allowable reduction of the effective resolving power of the wavelength monitoring spectrometer $R_{mon,eff}$. For instance, a tolerated maximum reduction of $R_{mon}$ by fifty percent can be expressed as follows.

$$R_{mon,eff} \geq \frac{R_{mon}}{2} \Rightarrow D \geq \left|\frac{R_{mon}}{R_{ref}}\frac{\Delta\lambda_{ref}}{\lambda_{mon}}\frac{r_{mon}}{\sqrt{3}}\right| \quad \text{(Eq.6)}$$

Alternatively, the criterion for controlling the relative error $\delta_{mon}$ may be formulated in terms of an upper bound for the relative error $\delta_{mon}$, e.g. $\delta_{mon} < \varepsilon$ (e.g. $\varepsilon = 10^{-4}$) and the following expression is derived for the difference in thermal wavelength drift rates D.

$$\delta_{mon} < \varepsilon \Rightarrow D > \left|\frac{R_{mon}}{R_{ref}}\frac{\Delta\lambda_{ref}}{\lambda_{mon}}\right|\left|\frac{r_{mon}}{\sqrt{\varepsilon^2 R_{mon}^2 - 1}}\right| \quad \text{(Eq.7)}$$

The following example shows how the difference in thermal wavelength drift rates D is controlling the fifty percent criterion on the reduction of the effective resolving power $R_{mon,eff}$ in equation (Eq. 6) when applied to a 220 nm silicon-on-insulator (SOI) platform with a thermal silicon oxide cladding and 450 nm wide nanowire waveguides. A ring resonator structure or an AWG built from this waveguide structure typically has a thermal wavelength drift rate of about 69.4 pm/K in the C-band at 1550 nm as evidenced by simulation results plotted in FIG. 8. For a single spectrometer one has $R_{mon}=R_{ref}$; assuming a monitored wavelength which is expected to shift by less than 30 nm and which lies in the C-band (e.g. located at 1565 nm), and further assuming a tracking range of about ±10 nm for the spectral reference line, which includes a predetermined range of operating temperatures of at least ±50 K (in fact, the minimum required tracking range for +/−50 K is +/−50 K*69.4 pm/K=+/−3.47 nm and therefore a tracking range of about +/−10 nm allows for a range of operating temperature much broader than +/−50 K), the application of equation (Eq. 6) reduces to $$D \geq \left| \frac{10 \text{ nm}}{1565 \text{ nm}} \frac{69.4 \frac{pm}{K}}{\sqrt{3}} \right| \Rightarrow D \geq 0.3 \frac{pm}{K}.$$

Figure 9:
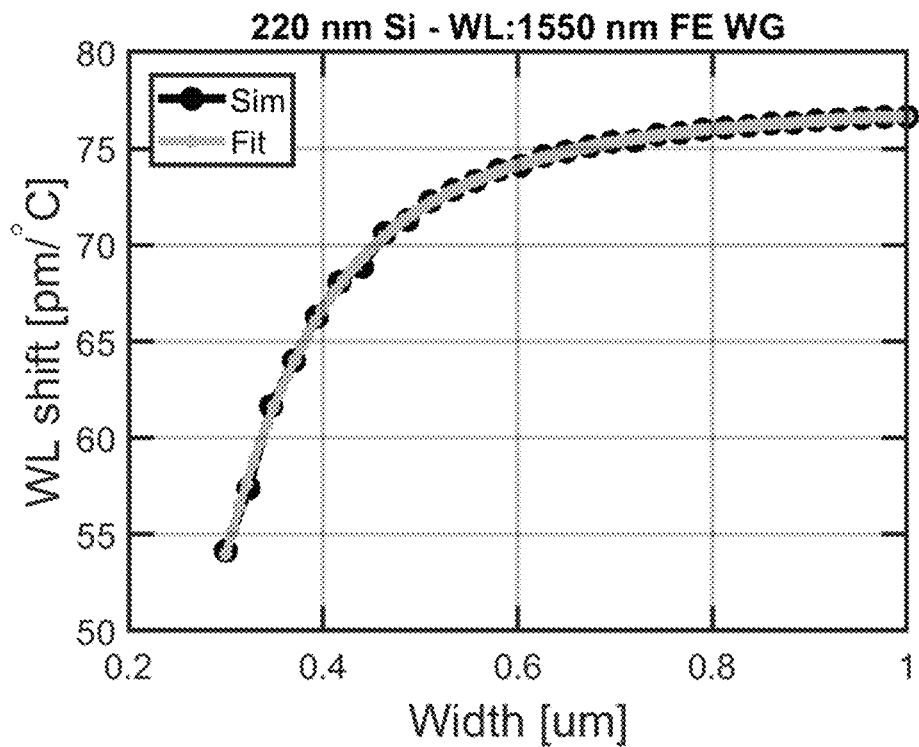

FIG. 9 shows the simulation results for a variety of similar waveguide structures that are obtained by changing the width of the waveguide implemented in the same 220 nm SOI platform with thermal silicon oxide cladding and supports that the above difference in thermal wavelength drift rates D is achievable. According to the plotted curve in FIG. 9, the thermal drift rate can be changed by more than 20 pm/K, thus more than the 0.3 pm/K mentioned above, in the range of waveguide widths between 300 nm and 1000 nm. Application of the criterion in equation (Eq. 7) with the same characteristic figures, a spectral resolving power $R_{mon}=R_{ref}=1550$ nm/0.1 nm=$1.55*10^4$, and a relative error bound $\varepsilon=10^{-4}$ yields D>0.3 pm/K, which can also be complied with. Even if the resolving power of the first spectrometer is ten times less than the resolving power of the further spectrometer, in embodiments of the invention in which two separate spectrometers are provided (e.g. scaling the bandwidth and output channel spacing by a factor of ten to allow for a broader predetermined temperature range), the application of the criterion of equation (Eq. 7) yields D>3 pm/K. Hence, the selection of wider waveguide widths (e.g. 800 nm) for the first AWG spectrometer and narrower waveguide widths for the ring resonator structure as optical filter (e.g. 400 nm) would still fulfill the set criterion. Incidentally, the above example demonstrates that the tracking range for the spectral reference line in the range of operating temperatures +/−50 K (e.g. −30° C. to +70° C.) could be reduced to less than +/−5 nm, e.g. +/−3.5 nm. A narrower tracking range of wavelength positions for the at least one spectral reference line has the additional advantage that, for a same number of spectrometer channels, the resolution of the spectrometer can be increased, e.g. a resolution of about 1 pm is obtainable in the C-band.

Figure 8:
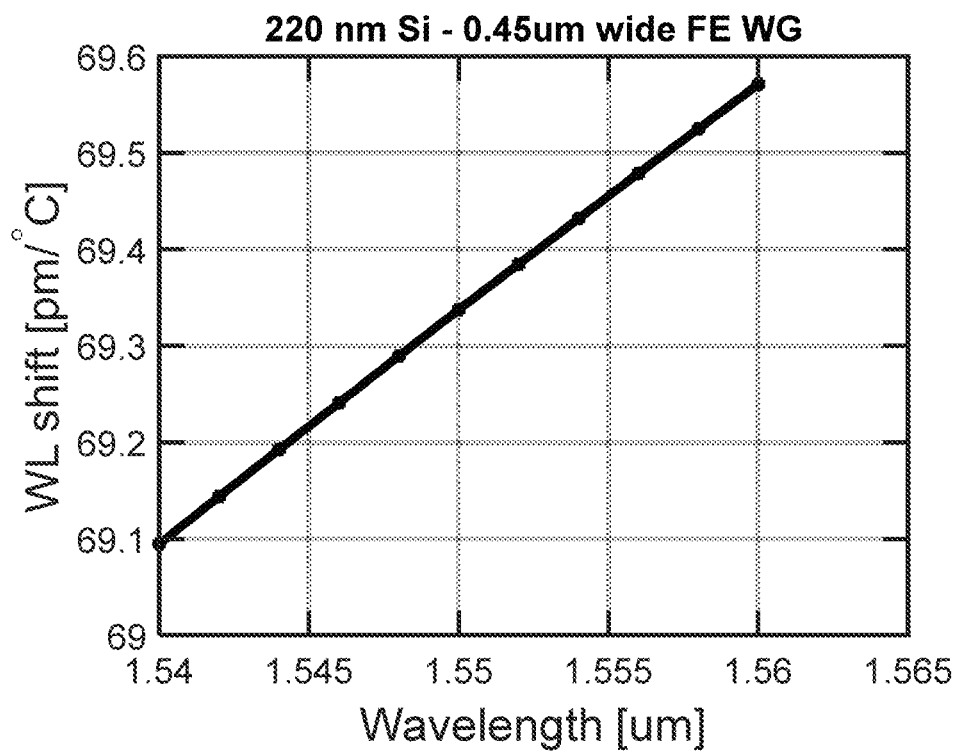
FIG. 8 and FIG. 9 are graphs illustrating the thermal wavelength drift rates as a function of wavelength and waveguide width in a silicon-on-insulator platform in which photonic integrated chips according to embodiments of the invention can be implemented.
Figure 10:
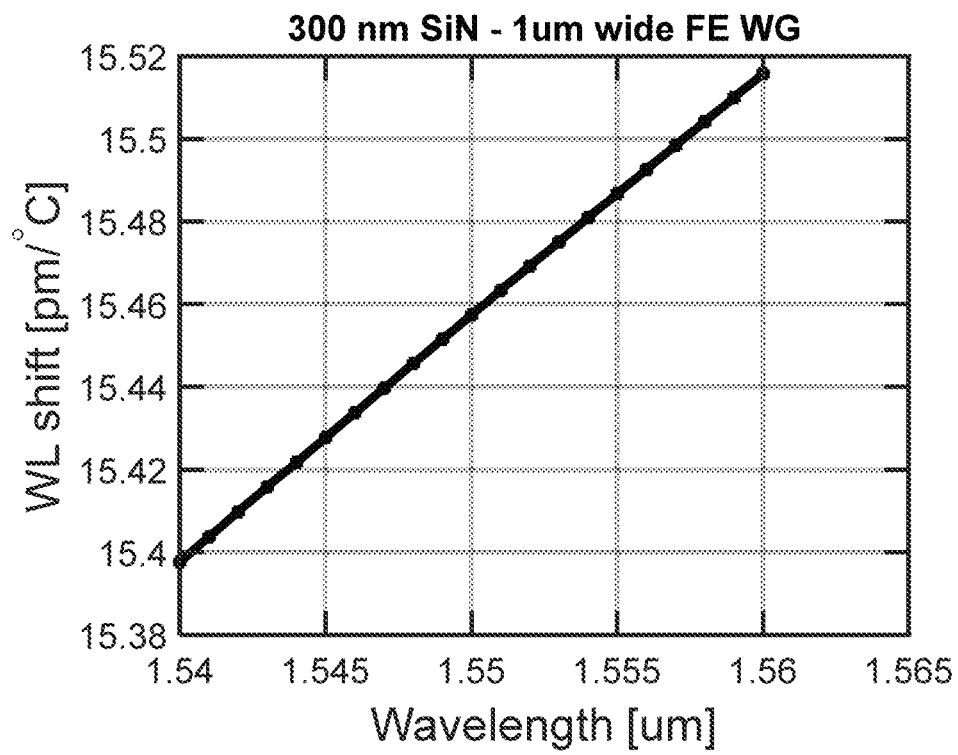
FIG. 10 and FIG. 11 are graphs illustrating the thermal wavelength drift rates as a function of wavelength and waveguide width in a silicon nitride platform in which photonic integrated chips according to embodiments of the invention can be implemented.
Figure 11:
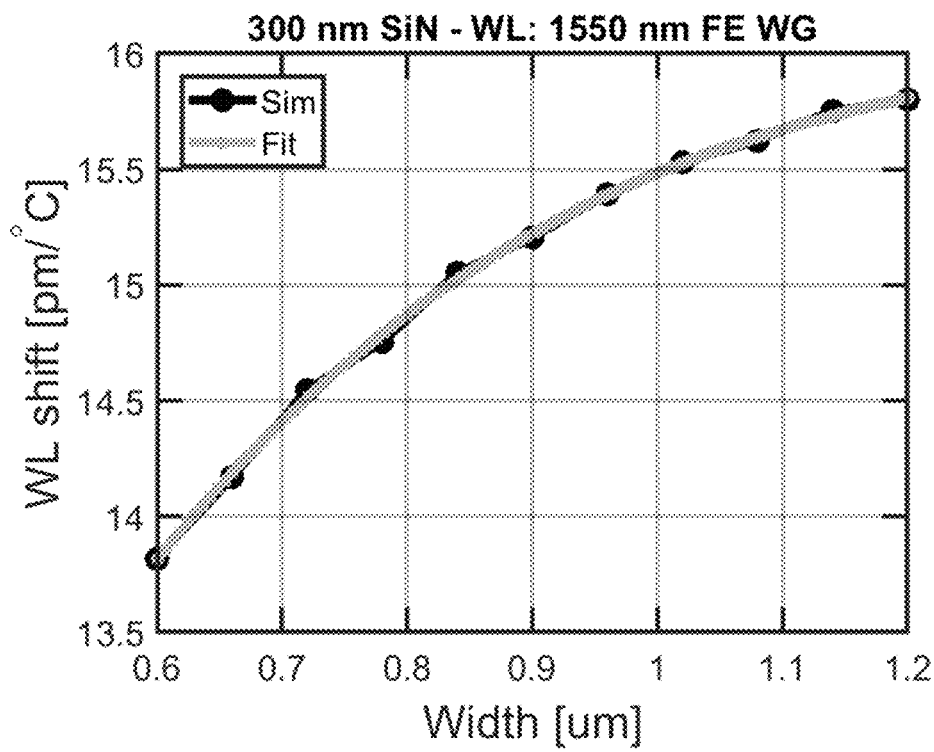

FIG. 10 and FIG. 11 show the thermal wavelength drift rates and thermal wavelength drift rate variations as a function of the waveguide width in a 300 nm silicon nitride platform with thermal silicon oxide claddings, similar to the contents presented in FIG. 8 and FIG. 9 in relation to a SOI platform. An optical filter such as a ring resonator structure or a spectrometer (e.g. of the AWG type) based on 1000 nm wide waveguides in the 300 nm silicon nitride platform has a characteristic thermal wavelength drift rate of about 15.5 pm/K in the C-band at 1550 nm as evidenced by simulation results plotted in FIG. 10. Repeating the previously studied case of a single spectrometer ($R_{mon}=R_{ref}=1.55*10^4$), a monitored wavelength located in the C-band (e.g. at 1565 nm) and a tracking range of about 10 nm for the spectral reference line, the application of equation (Eq. 6) for a fifty percent reduction of the effective resolving power gives D≥0.1 pm/K. Similarly, the application of the criterion $\varepsilon=10^{-4}$ related to equation (Eq. 7) yields D>0.1 pm/K. Further, in the case of two separate spectrometers differing by a factor of ten in their resolving powers, the same criterion yields D>0.7 pm/K. Inspection of FIG. 11 reveals that these differences in the thermal wavelength drift rates D can be realized by a design-guided selection of the waveguide widths. In particular the last inequality D>1.8 pm/K can be satisfied by selecting 1000 nm wide and 600 nm wide silicon nitride waveguides for the spectrometer and the optical filter respectively. Selecting the wider waveguide width for the spectrometer offers the advantage of a reduction in phase errors, especially along wider arrayed waveguides of AWGs, in addition to a more compact ring resonator based optical filter.

So far the relative error contributions related to the thermal wavelength drift rates to the overall relative error for the wavelength position of the monitored spectral line have been neglected. This approximation is legitimate as long as the resolving power is the limiting factor. It is also legitimate if the thermal wavelength drift rates have been determined experimentally in a testing or calibration method, whereby any uncertainty on the thermal wavelength drift rates related to waveguide geometry variations during manufacture and wavelength dispersion by the waveguide are effectively removed. However, the testing or calibration of each individual PIC on a wafer in mass-scaled manufacture is a tedious, costly, and time-consuming endeavor. It is therefore of advantage to design the photonic components of the PIC, particularly the optical filter and the spectrometer(s), in a fabrication-tolerant manner, e.g. by taking statistics on wafer-scale non-uniformities into account already at the design stage. Wafer-scale non-uniformities are observed in respect of the manufactured waveguide widths, for example, which are statistically distributed around a nominal design value. For a fabrication-tolerant design, only a single PIC of the wafer or a few PICs of the same wafer are tested or calibrated, e.g. tested in respect of their waveguide width deviations from a nominal value. The waveguide width deviations from the nominal value in respect of the remaining PICs of the same wafer can be obtained by interpolation and extrapolation techniques or can be estimated with higher confidence levels (depending on the tested sample size). Any remaining uncertainty with respect to the non-uniformly distributed waveguide widths across PICs of a same wafer are causing deviations from the nominal thermal wavelength drift rates, which in turn decrease the effective resolving power of the spectrometer receiving the spectral line to be monitored. Wide waveguides are only asymptotically affected by width variations (cf. FIG. 10) such that the resulting relative error for the thermal wavelength drift rate can often be neglected in wide waveguides. The precise asymptotic range of wide waveguides depends on the specific platform, e.g. above 800 nm for SOI and above 1200 nm for silicon nitride platforms. A standard 300 mm wafer-scale process for the manufacture of PICs is expected to yield superior waveguide width uniformity over the wafer area, for example, when compared to the same process performed for standard 200 mm wafers. In consequence, reduced relative error contributions of the thermal wavelength drift rates caused by waveguide geometry variations are obtainable by 300 mm wafer-scale process. Experimentally verified standard deviations for the waveguide widths in a 200 mm wafer-scale process are as low as 3 nm over the entire wafer area and even less on shorter scales. Taking notice of the fact that the thermal wavelength drift rates relating to narrower waveguides in FIG. 9 and FIG. 11 are affected more severely by deviations from the nominal value, the worst case scenario corresponds to a ±3 nm deviation for a nominally 300 nm wide SOI waveguide (e.g. minimum safe linewidth) and a nominally 600 nm wide silicon nitride (SiN) waveguide respectively. The absolute deviation of the thermal wavelength drift rates for these waveguides amounts to ±0.6 pm/K for the 300 nm wide waveguide in SOI and to ±0.02 pm/K for the 600 nm wide waveguide in SiN. Therefore, the relative errors for the thermal wavelength drift rates have an upper bound of $1.1*10^{-2}$ for the SOI platform and $1.4*10^{-3}$ for the SiN platform, which upper bounds are reached by the narrowest waveguides in FIG. 9 and FIG. 11; the relative errors for the wider waveguides are on the order of $10^{-4}$. Wide waveguides are preferably implemented for the spectrometer(s) to avoid the accumulation of phase errors, whereas the optical filter may select narrow waveguides to achieve a substantial difference in the thermal wavelength drift rates D. Hence, the relative error for the thermal wavelength drift rate of the optical filter will be the dominant relative error contribution, provided that the spectrometer(s) have moderate to large resolving power, e.g. $R=10^5$ or more. Referring back to equation (Eq. 5), the effective resolving power $R_{mon,eff}$ is not much affected as long as $$R_{mon} \frac{\Delta \lambda_{ref}}{\lambda_{mon}} \frac{r_{mon}}{D} \delta(r_{opt}) \ll 1$$

this time. Equations (Eq. 6) and (Eq. 7) can be applied if the relative error for the thermal wavelength drift rate $\delta(r_{opt})$ is substituted for the inverse of the first spectrometer's resolving power $1/R_{ref}$. Choosing $\varepsilon=10^{-4}$ for the error control criterion formulated in equation (Eq. 7), e.g. an absolute wavelength position accuracy better than 157 pm (the accuracy for relative shifts in wavelength position can be even better if a priori knowledge of previous measured datapoints is included) for a monitored spectral line at 1565 nm wavelength, corresponding to a typical spectral width of a Fiber Bragg grating, and $R_{mon}=R_{ref}=10^5$, the minimum absolute difference in thermal wavelength drift rates for a 10 nm tracking range for the spectral reference line is D>4.9 pm/K for the SOI platform and D>0.1 pm/K for the SiN platform, respectively. As previously discussed, both values are within the achievable range of absolute thermal wavelength drift rate differences for the respective technology platforms. More generally, the spectrometers may also use waveguides of intermediate widths. Then, the mentioned upper bound may be used in respect of each relative error for the thermal wavelength drift rates contributing to the overall relative error $\delta_{mon}$, e.g. the upper bound is multiplied by a factor of three. Even then the required absolute thermal wavelength drift rate differences (D>14.8 pm/K for SOI and D>0.4 for SiN) are feasible by solely selecting the waveguide widths for the first spectrometer and the optical filter. However, increasing the resolving power of the first or further spectrometer $R_{mon}$ to $10^6$ and decreasing the tolerated overall relative error to $\varepsilon=10^{-5}$ results in D>49.3 pm/K, which is challenging for the SOI platform if the thermal drift rate selection is based on waveguide width alone. In such cases, other design parameters may also be selected to obtain the larger difference D, e.g. waveguide heights, top or side cladding materials, etc. The improvement of existing athermal designs, e.g. using waveguide materials with a negative thermo-optic coefficient, constitutes a further, non-limiting design choice. Nevertheless, this challenging case describes a worst case scenario for the waveguide width deviation across the entire wafer and may be mastered by performing testing or calibration also at multiple key points on the wafer to further reduce the amount of waveguide width uncertainty for PICs nearby the key points. Alternatively, one might consider restricting the tracking range further, e.g. to about +/−5 nm instead of +/−10 nm. This would again allow an implementation in the SOI platform which may be based solely on waveguide width selection. Such a reduced tracking range is still acceptable, in particular in applications in which a high resolution approach for the at least one tracked spectral reference line is combined with a low resolution approach for the at least one spectral line that is monitored (e.g. using a first spectrometer with high resolving power in respect of the spectral reference line(s) to be tracked and a further spectrometer with lower resolving power in respect of the at least one spectral line to be monitored).

The preceding description being focused on waveguide width deviations only, it is worth mentioning that a similar analysis can be performed for the waveguide height in rectangular waveguides. However, previous research has demonstrated that it is the waveguide width that is most affected by fabrication tolerances. Thickness variations of the core layer, corresponding to waveguide height, exist but they do not play a major role at short distances. The work of Lu et al., Opt. Exp. 25(9), 2017, for example, has shown that thickness changes for the defined waveguide geometries are only of secondary interest as compared to waveguide width changes over the wafer area and also in terms of gradients. The relative confinement in the vertical direction not being influenced in a noticeable way, the associated relative errors for the thermal wavelength drift rates of the spectrometers and the optical filter are usually negligible. Besides, the contribution of the relative errors in the thermal drift rates that are caused by waveguide width and waveguide height variations within the specific fabrication tolerances for a technology platform are expected to further diminish with ongoing improvements in semiconductor processes.

Having regard to temperature gradients, the following estimation is given in support of the idea that realistic gradients can be accommodated. Assuming that an operating temperature for the PIC differs by 1 K (e.g. non-uniform or inhomogeneous heating of the PIC) on opposite sides of a typical 5 mm×5 mm sized SOI-PIC, the corresponding difference in operating temperature between two structures that are spaced 100 micrometer apart, e.g. the first spectrometer and the optical filter, is 0.02 K. From the previous examples, FIG. 9, and FIG. 11, the typical thermal wavelength drift rates in relation to SOI and SiN platforms, with standard cross-sections of 220 nm by 450 nm, are known: about 77 pm/K for a 1000 nm wide SOI waveguide and about 15.8 pm/K for a 1200 nm wide SiN waveguide, at 1550 nm wavelength each. Hence, the largest additional wavelength deviation, which is caused by the 1 K temperature gradient over the simulated range of waveguide widths in FIG. 9 and FIG. 11, corresponds to 1.5 pm for the SOI platform and 0.32 pm for the SiN platform, respectively. It is noted that these are thermal wavelength drift deviations that are obtained for 1 K of sustained temperature difference across the borders of the 5 mm×5 mm sized PIC; in the event of larger sustained temperature differences due to inhomogeneous heating of the PIC, the above wavelength drift deviations are multiplied by the respective value of the temperature difference across the borders of the PIC. As such they constitute additional sources of systematic or random errors, depending on whether the temperature gradient is imposed permanently or is the result of random fluctuations. In the former case, the absolute accuracy of is worsened and in the latter case repeated measurements for a slowly moving monitored spectral line can be performed to reduce the random error contribution by averaging over the multiple measurements. In principle, thermal wavelength drift rates of 1.5 pm/K for the SOI platform and 0.32 pm/K for the SiN platform can be formally derived if one considers the imposed temperature gradient as an additional source of non-uniform heating of the PIC that is superimposed, but independent of the homogenous or uniform heating of the PIC. For instance, one can define a reference position for the determination of the overall operating homogenous temperature of the PIC as the position on the PIC at which one of the optical filter or the spectrometer is located. By consequence, the temperature gradient across the PIC as well as the related inhomogeneous thermal wavelength drift rate contribution is then determined by the temperature difference and the distance to a different location on the PIC with respect to the operating homogenous temperature at the reference position on the PIC. Good resolving powers on the order of $R=10^6$ (i.e. resolution at the picometer level) can thus be achieved irrespective of the existence of a 1 K temperature gradient. In fact, a gradient of 1 K would be considerably larger than what is actually expected from a good heat conducting substrate material and/or a good heat conducting packaging solution (e.g. a thermal paste, heat sink or metal carrier structure on which the PIC is mounted).

A temperature compensation method is proposed and described in the following with reference to FIG. 5. The proposed method aims at an accurate wavelength determination for the monitored spectral line in the presence of temperature variations falling within a predetermined operating temperature range of the PIC comprising the spectrometer, e.g. at least (20±50) degree Celsius, e.g. (20±100) degree Celsius. The method does not rely on temperature control by heating or cooling, but can be combined with such an approach, for instance if the temperature stabilization is coarse and prone to fluctuations that significantly impact the wavelength position accuracy of the monitored spectral line(s). Likewise, the present temperature compensation method can be applied to imperfectly manufactured athermal on-chip spectrometers to further improve their temperature insensitivity, e.g. far below the typically achievable thermal wavelength drift rate of 10-20 pm/K. The magnitude of the denominator in equation (Eq. 4) is even larger in the case of thermal wavelength drift rates having opposite signs, e.g. if one of the first spectrometer or the optical filter comprise waveguide material with a negative thermal-optic coefficient, resulting in an athermal or an overcompensated temperature behavior.

During normal wavelength monitoring use of the PIC as part of a wavelength monitoring device, the operating temperatures of the chip itself as well as of the first or further spectrometer provided in or on the chip are unknown. Operating temperatures of the spectrometers which are different from a reference temperature are affecting the spectrometer spectral response curve by a thermal wavelength drift. A wavelength position of a monitored spectral line is shifting in response to external environmental variables (e.g. pressure or temperature at a sensor location) that do not depend on the operating temperature of the PIC. Therefore, the thermal wavelength shift of the first or further spectrometer relative to monitored spectral line(s) is also unknown and cannot be compensated even if the thermal drift rate is, in principle, known from or can be estimated based on the spectrometer design.

In embodiments of the present invention, this lack of information on the thermal wavelength drift relating to the first or further spectrometer, which is configured for detecting wavelength shift of the monitored spectral line(s), is overcome by a photonic integrated chip (PIC) according to embodiments of the invention as previously described. Such a PIC is configured for providing at least one on-chip spectral reference line to an input of the first spectrometer. Thermal wavelength drift rates of the at least one spectral reference line detected relative to the first spectrometer spectral response curve and of the first spectrometer spectral response curve itself are, by design, selected to differ one from another by a minimum absolute amount D. This amount D depends on the technology platform, the effectively achieved resolving power of the spectrometer which is receiving the at least one spectral line to be monitored, and may also depend on one or more parameters which define a waveguide structure in that platform if fabrication-tolerant wafer processes are sought for.

Figure 5:
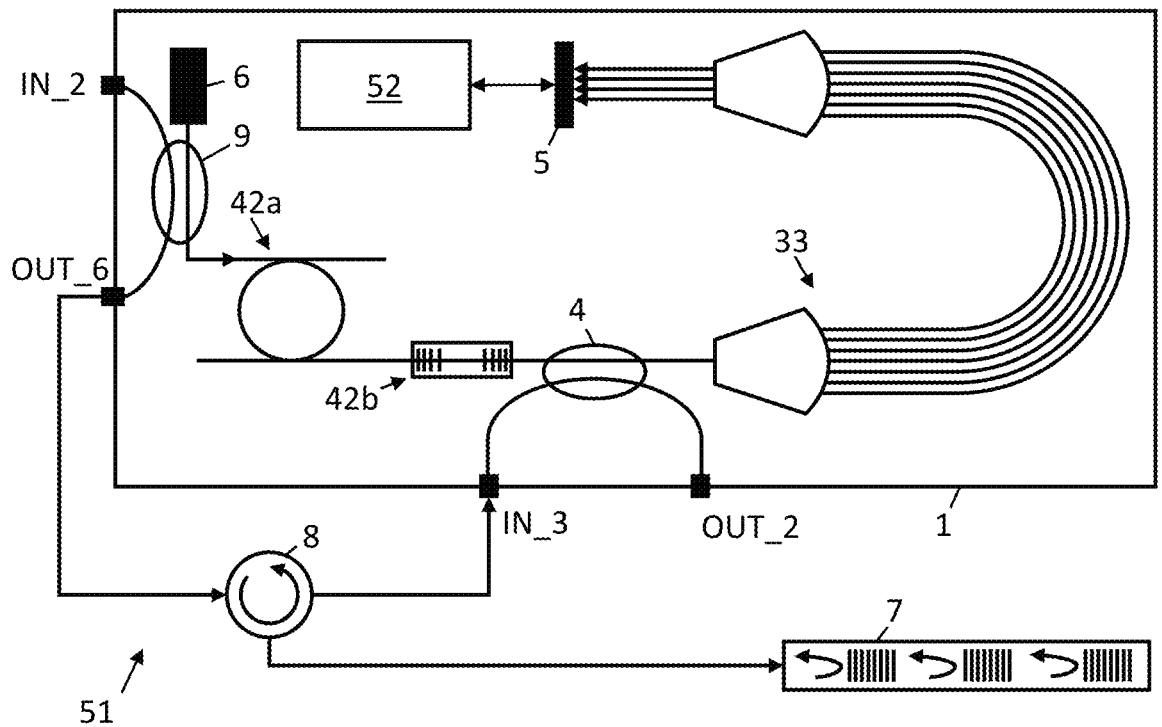
FIG. 5 shows a wavelength monitoring device according to embodiments of the invention, which can be used in Fiber Bragg grating-based wavelength sensing systems.

Referring now to FIG. 5, a wavelength monitoring device in accordance with embodiments of the invention is shown. The wavelength monitoring device 51 comprises a PIC 1 according to previously described embodiments and is capable of temperature-compensated monitoring of spectral lines. For example, the wavelength monitoring device 51 can be used in combination with a Fiber Bragg grating-based sensing sensor or sensor system 7 to interrogate the reflected wavelength(s) from a remote Fiber Bragg grating (FBG). The wavelength monitoring device 51 can also be used in combination with a lasing device or an array of lasing devices (e.g. a transmitter module) to interrogate the emitted laser lines without being subject to an operating temperature bias of the PIC or the transmitter module comprising the wavelength monitoring device. In case of a detectable wavelength drift of an interrogated laser line, a feedback control module can re-adjust the laser line. Tunable laser sources, for example, require good synchronization between laser and detector, linear sweep characteristics (wavelength-time linearity), dense logging, and good wavelength absolute accuracy and repeatability to perform fast continuous sweeps; also for slower stepped sweeps a good wavelength absolute accuracy and repeatability are required. However, many commercial available tunable laser sources have absolute wavelength accuracies of several pm, e.g. up to 10 pm. This is generally considered as insufficient for highly accurate wavelength monitoring applications and a wavelength monitoring device according to embodiments of the invention proves to be useful in this respect.

The wavelength monitoring device 51 further comprises at least one photodetector 5, e.g. an array of photodetector elements, e.g. photodiodes, which can be an integral part of the PIC 1. A processing unit 52 of the wavelength monitoring device 51 is connected to the photodetector 5 and configured for receiving the spectral response signals detected in each of a plurality of output channels of the first spectrometer 33. In embodiments providing a further spectrometer, the processing unit 52 is also configured for receiving the spectral response signals detected in each of a plurality of output channels of the further spectrometer. In embodiments of the invention, the processing unit 52 may be provided as a controller, as a single processor, or as multiple processors, which can be shared. The processing unit 52 may be provided on the same PIC 1, e.g. may be firmly adhered (e.g. by bonding) to the PIC to form a single unit. Moreover, the processing unit 52 is configured for determining a wavelength position, e.g. center wavelength, for the at least one spectral reference line and the at least one monitored spectral line using the received spectral response signals as input. For instance, the wavelength position of one or more spectral reference lines or one or more monitored spectral lines can be determined according to a detected peak signal, a center-of-mass signal, etc., as described hereinabove. Wavelength shifts of the at least one spectral reference line and the at least one monitored spectral line are obtained by generating differences between the current wavelength positions for the at least one spectral reference line and the at least one monitored spectral line and a reference value for each determined wavelength position. The reference values may correspond to the initially determined, e.g. first determined, wavelength positions for the at least one spectral reference line and the at least one monitored spectral line. Otherwise, reference values may be obtained during device calibration and are stored in a memory of the wavelength monitoring device 51, or may be default values stored in a memory of the wavelength monitoring device 51. The memory may be part of the processing unit 52 or may be provided as a separate solid-state storage device such as SD-card, flash memory, non-volatile memory/RAM, etc. Additionally, the processing unit 52 is configured for determining a corrected wavelength position for each monitored spectral line such that the thermal wavelength drift for the spectrometer response curve is compensated in response to the operating temperature changes of the PIC 1. To achieve this the processing unit may load and execute instructions of a program code (e.g. a software module stored in the memory of the wavelength monitoring device), which when carried out by the processing means apply the compensation formula of equation (Eq. 3a) or (Eq. 3b). Alternatively, the processing unit 52 may determine the corrected wavelength position for each monitored spectral line by searching in and retrieving values from a calibrated look-up table, and optionally interpolate between the retrieved values. For instance, the look-up table may be comprised by the software module and/or is stored in the memory of the wavelength monitoring device. The look-up table may be organized into a plurality of rows and each row comprises data structure, e.g. an n-tuple or a list, which associates a predetermined thermal wavelength drift of the at least one spectral reference line $\Delta\lambda_{ref,i}$ (e.g. of two, tree, or more reference lines) with a corresponding predetermined thermal wavelength drift of a spectral calibration line relative to the spectral response curve of the first or further spectrometer, $\Delta\lambda_{cal}$. For instance, each row of the look-up table may correspond to a temperature step of a prior performed calibration method, in which the determined thermal wavelength drifts of the at least one spectral reference line is recorded together with the thermal wavelength drift of a stable spectral calibration line determined relative to the spectral response curve of the first or further spectrometer. By way of example, the processing unit may send a search query for retrieving a $\Delta\lambda_{cal}$ value that best matches (e.g. identical or shortest metric distance) a determined wavelength drift $\Delta\lambda_{ref}$ during use, e.g. $\Delta\lambda_{cal}:=\Delta\lambda_{cal}.[\min(\Delta\lambda_{ref}; \Delta\lambda_{ref})]$, optionally interpolate between several retrieved values $\Delta\lambda_{cal}$ for a preset search distance: $dist(\Delta\lambda_{ref}; \Delta\lambda_{ref})$ <d0, and calculate the corrected monitored wavelength positions as $\hat{\lambda}_{mon,i}:=\lambda_{mon,i}-\Delta\lambda_{cal}$. The look-up table obtained in respect of a particular PIC of a wafer (e.g. located at a key position of a wafer) may be shared amongst several non-tested/non-calibrated PICs of the same wafer. In yet another alternative, the processing unit 52 may determine the corrected wavelength position for each monitored spectral line by evaluating a parametric model (function) f for the determined thermal wavelength drift of the at least one spectral reference line $\Delta\lambda_{ref,i}$ as argument, e.g. $\lambda_{mon,i}$: $=f(\Delta\lambda_{cal}; \Delta\lambda_{ref,i}) [\Delta\lambda_{ref,i}]$ which implies that the predetermined wavelength shift values obtained from calibration coincide with, or are used to fix, the model free parameters. If the temperature of each temperature step has been stored in the look-up table as well, which is optional, then the processing unit 52 may also provide an estimation of the current operating temperature.

Wavelength dispersion is affecting the temperature compensation method in at least the following two ways: first, the determined center wavelength(s) of the received spectral line(s) for interrogation/wavelength monitoring, when compensated, generally differ from the initial position of the fixed calibration line at standard temperature, and second, the PIC used when performing the temperature compensation method is not one of the PICs of the wafer that have been calibrated.

With respect to the former, a wavelength position for a compensated interrogated spectral line being different from the initial position of the fixed calibration line, in the presence of wavelength-dependent thermal wavelength drift rates $r(\lambda)$, results in different overall (integrated) wavelength drifts for a same temperature difference $\Delta T$. Therefore, applying the associated predetermined wavelength shift $\Delta\lambda_{cal}$ amounts to applying a correction term to the uncompensated center wavelength of the interrogated spectral line which is slightly larger or smaller. In practice, this negative effect can be mitigated by using more than one spectral reference line. For instance, the determined thermal wavelength drifts for two adjacent spectral reference lines, between which the interrogated spectral line is located, may serve as inputs for a search query in the look-up table, resulting in two different associated predetermined wavelength shifts ($\Delta\lambda_{cal,a}$, $\Delta\lambda_{cal,b}$) being retrieved. In general, a larger thermal wavelength drift rate for spectral reference lines located at longer wavelengths causes larger wavelength drifts at identical temperature difference as compared to spectral reference lines located at shorter wavelengths (e.g. by virtue of the proportionality of the thermal wavelength drift rate with wavelength). However, the inverse dependence of the thermal wavelength drift rate on the group refractive index and the confinement factor (i.e. respective dn/dT contributions of core and cladding), this general behavior may not always apply, for instance at wavelengths near the zero-wavelength dispersion wavelength of the waveguide. A refined or rectified correction term for application to the determined, uncompensated center wavelength of the interrogated spectral line may then be obtained by weighted interpolation between the two retrieved predetermined wavelength shifts ($\Delta\lambda_{cal,a}$, $\Delta\lambda_{cal,b}$), wherein the spectral distance between the center wavelength of the (uncompensated) interrogated spectral line and each of the two adjacent spectral reference lines can be used as weights. This can be extended in a straightforward fashion to more than one spectral reference line. Determining the interpolation weights may also take into account the theoretical dispersion relation of waveguides of known cross-section, which depend only weakly on variabilities due to fabrication. Alternatively, a computed rectification or refinement of the correction term used for achieving the temperature-compensated readout of the at least one interrogated spectral line can be obtained based on equation (Eq. 3b). Applying this equation to both the interrogated spectral line and the fixed calibration line—which share the same thermo-optic coefficient and the same group refractive index—and forming the ratio, one derives the following explicit expression for the rectified correction term.

$$\Delta\lambda_{mon,rect} = \lambda_{mon}\frac{\Delta\lambda_{cal}}{\lambda_{cal,0}+\Delta\lambda_{cal}} = \Delta\lambda_{cal}\frac{\lambda_{mon}}{\lambda_{cal,det}} \Rightarrow \hat{\lambda}_{mon} = \lambda_{mon}\left(1+\frac{\Delta\lambda_{cal}}{\lambda_{cal,0}+\Delta\lambda_{cal}}\right) \quad \text{(Eq.8)}$$

With respect to the latter, the use of a non-calibrated PIC from an ensemble of PICs belonging to a same wafer will have the effect that, with some probability, the at least one spectral reference line is moved from its initial position at standard temperature as defined by one of the calibrated PICs of the wafer (e.g. the closest on the wafer). This is mainly due to process variability. Although the thermal wavelength drifts of the at least one spectral reference line of the uncalibrated PIC are measured relative to its initial position, which has moved relative to the calibrated PIC of the wafer and which can be determined during calibration too, or later during first use as part of the wavelength monitoring device, a small difference in thermal wavelength drift rates will still be the consequence of the offset in initial positions. Hence, the tabulated correspondences of detected wavelength shifts for the at least one spectral reference line and the associated predetermined wavelength shifts $\Delta\lambda_{cal}$ is biased. This bias can be corrected for, provided the offset is known. The same derivation which is forming the basis of equation (Eq. 8) is applicable to the offset initial positions of the spectral reference line(s) on the uncalibrated PIC. Therefore, the following rectified thermal wavelength drift value is used as input to the search query for retrieving matches form the look-up table or as input to the parametric model.

$$\Delta\lambda_{ref,offset,rect} = \lambda_{ref,0} \frac{\Delta\lambda_{ref,offset}}{\lambda_{ref,offset,0}}$$

It is further noted that the initial positions of the spectral reference line(s) of the calibrated PIC can also be used for the uncalibrated PIC, possibly applying interpolation between multiple calibrated PICs on the wafer, in embodiments of the invention for which process variability is known to be sufficiently low to result in negligible offsets of these initial positions.

According to an advantageous embodiment, the wavelength monitoring device 51 may also comprise a broadband light source 6, e.g. a superradiant light emitting diode (SLED), which is provided on the same PIC 1, e.g. is co-integrated on the same photonic chip 1 using established bonding or transfer printing techniques. Alternatively or additionally, an external broadband light source may be used. The broadband light source 6 emits radiation over a broad spectral range (e.g. 30 nm or more, e.g. 50 nm), e.g. covering the spectral range swept by the temperature-induced wavelength drift of the at least one spectral reference line provided by the optical filter over at least the predetermined temperature range (e.g. +/−50 K), and the emitted light is coupled into a waveguiding structure for delivery to the optical filter, e.g. to the ring resonator structure 42a. A portion of the emitted broadband radiation is coupled out off-chip, e.g. via an output connector 'OUT_6', and is directed towards the FBG sensor system 7, e.g. via optical fibers. In the present example, the amount of broadband radiation sent to the FBG sensor system 7 is determined by the coupling ratio of the optical coupler 9. An optical circulator 8, which may be included in the waveguide monitoring device 51 (e.g. provided on-chip or off-chip), is directing the wavelengths reflected from the FBG sensor system 7 back to the PIC 1 for monitoring. The optical circulator 8 also protects the emitting light source 6 from disturbances caused by back-reflections, e.g. by isolating the optical pathways of the emitted light and the light reflected by the FBG sensor system 7. As an alternative to the optical circulator, a further optical coupler (e.g. off-chip fiber 2×2 optical coupler or on-chip 2×2 optical directional or MMI coupler) may be used. For instance, the optical coupler is receiving the broadband radiation emitted by the light source 6 (via the optical coupler 9) at an input port thereof, a fraction of the received power is output at the transmitting or coupling port and is sent to the FBG sensor system 7. The one or more spectral lines reflected by the FBG sensor system 7 are then coupled to the isolation port of the optical coupler, which is connected to an input connector of the PIC 1, e.g. to 'INP_3'.

In the following a calibration method for obtaining the predetermined thermal wavelength drifts to be used with the wavelength monitoring device comprising the photonic integrated chip (PIC) is described. In embodiments of the invention, the predetermined thermal wavelength shifts form the calibration data underlying the look-up table or the parameter fit to the parametric model already described. This calibration data can be obtained from the calibration of a particular PIC and then be shared with many similar PICs of the same wafer. Shared calibration data may include a modification step which accounts for the position of the PIC on the wafer relative to the PICs for which calibration data has been acquired. Such a modification step may use available prior knowledge on wafer-level statistics, e.g. including metrological data on waveguide width uniformity, wafer stress distributions, etc. Systematic deviations and trends can thus be successfully corrected.

In a first step of the calibration method, an input radiation signal comprising or consisting of a narrow spectral calibration line is applied to the spectrometer of the photonic integrated chip (PIC), which is configured for receiving the at least one monitored spectral line during use of the wavelength monitoring device, i.e. to the first spectrometer or to the further spectrometer for the purpose of wavelength monitoring. The narrow spectral calibration line may be conveniently provided as the lasing line of an off-chip laser source, e.g. a fiber laser, fiberized diode laser, gas laser, etc., and is preferably characterized by a spectral laser linewidth that is smaller than the spectral bandwidth of any output channel of the receiving spectrometer, e.g. typically in the sub-GHz regime. In other embodiments of the invention, the narrow spectral calibration line may be provided as the lasing line of an on-chip laser source under stringent calibration conditions (e.g. cooling), which lasing line would cease to be suitable for calibration purposes when the PIC is operated under the more relaxed conditions of normal use. Furthermore, the source generating the spectral calibration line is stabilized (e.g. via a feedback control system) and a center wavelength thereof is maintained close to a fixed wavelength position, whereby systematic calibration errors are advantageously reduced. For example, the stabilization of the source generating the calibration line prevents large wavelength excursions of the spectral calibration line due to thermal noise, low-frequency noise, thermal drifts, and other destabilizing effects impacting the source, e.g. wavelength excursions beyond the maximally achievable wavelength position determination accuracy of the spectrometer receiving the calibration line. In particular, it is ensured that the so spectral calibration line is not affected by temperature changes at least in the predetermined temperature range the PIC is operable for. Further, the at least one reference line provided by the optical filter is applied to the first spectrometer. An on-chip or off-chip broadband light source, e.g. an SLED, amplified spontaneous emission spectrum of a fiber amplifier, or broadband tunable laser, may be connected to an input of the optical filter for this purpose.

Next, the temperature is increased or decreased in a series of well-controlled steps, e.g. by uniformly heating or cooling a thermally conductive support structure of the PIC or chip-comprising wafer, or by uniformly heating or cooling the PIC in a thermal chamber. At each temperature step a wavelength shift measurement is performed. The temperature at each step can be optionally verified by a thermometer (e.g. also uniform heating or cooling of the PIC at each temperature step can be optionally verified in a multi-point temperature verification step) and multiple wavelength shift measurements can be acquired at each temperature step to improve precision. Performing a wavelength shift measurement comprises detecting the signal strength distribution over the individual spectrometer output channels in respect of the at least one spectral reference line and the spectral calibration line. In some embodiments, this involves detecting the signal strengths in the spectrometer output channels of the first and the further spectrometer. In other embodiments, only the signal strengths in the spectrometer output channels of the first spectrometer are detected. Based on the detected signal strengths, the wavelength position, e.g. the center wavelengths, of the calibration line and each reference line is determined, e.g. using determination approaches directed to a peak signal, a center-of-mass signal, etc.

In a further step, thermal wavelength drifts are derived for the calibration line and each reference line. They reflect the thermal wavelength drift of the first or further spectrometer response curve relative to the fixed calibration line and the thermal wavelength drift of the first spectrometer response curve relative to the thermal wavelength drift of the optical filter response curve. Thermal wavelength drifts are obtained as wavelength differences between the determined wavelength positions and corresponding reference positions, e.g. the wavelength positions determined at a standard temperature (e.g. 20 degree Celsius) before performing the first temperature step. As a result, for each temperature step and the pre-defined standard temperature, a data structure is obtainable in which the thermal wavelength drift $\Delta\Lambda_{cal}$ of the calibration line is associated with the thermal wavelength drifts of the reference line(s) $\Delta\Lambda_{ref,i}$. Optionally, the current (mean) temperature at each temperature step is appended to the data structure. This data association may be stored as in a row of a look-up table in a memory device of the wavelength monitoring device. Depending on the wavelength range that is to be monitored, the supported temperature range (e.g. +/−50 K), and the accuracy of any correction/interpolation scheme (e.g. first-order or higher-order), the number of rows stored in the look-up table may vary between tens of rows to thousands of rows, for instance. Alternatively, the ensemble of data associations, which would correspond to all rows of the look-up table, may be used to fit the free parameters of a parametric model f which maps thermal wavelength drifts of the at least one reference line to thermal wavelength drifts of the monitored calibration line. This fitting of free parameters may involve curve fitting, least-square fitting, non-linear fitting, logistic regression, single-layer perceptrons, etc.

In these exemplary PICs, and wavelength monitoring devices comprising the same, the provided spectrometers are illustrated as arrayed waveguide gratings which offer good spectral transmission characteristics at a moderate number of channels. However, the one or more spectrometers may also be provided as an etched grating, e.g. echelle grating, as a cascaded filter bank, e.g. comprising various ring resonators coupled to a bus waveguide or stages of interferometric devices, e.g. tree-based Mach-Zehnder spectrometer.

The optical filter is typically provided as a sharply peaked (micro-)ring resonator, Fabry-Perot cavity, cascaded interferometers, e.g. a cascade of Mach-Zehnder interferometers. Interferometric devices with a less pronounced resonance peak, which occupy a larger spectral bandwidth, may be provided as an alternative, for instance, if the AWGs usable spectral range, e.g. one FSR, is large enough to avoid spectral collisions or overlap as much as possible.

Adequate implementations of the bandpass filter may be based on, e.g. synthesized as higher-order filters from, coupled resonator optical waveguides (CROWs), coupled Mach-Zehnder interferometers, distributed Bragg reflectors/filters, or combinations thereof.

Photonic integrated chips (PICs) according to embodiments of the invention may be manufactured in various existing technology platforms, if available at a wafer-scale. Non-limiting examples of technology platforms for the manufacture of PICs include silicon-on-insulator, silicon nitride, and III-V platforms, such as InP, in which photodetectors are directly obtainable. Also silica may be used as a substrate material in which the spectrometer(s) of the PIC are formed, despite the relatively weak thermo-optic coefficient of silica. Highly accurate wavelength monitoring applications using silica PICs may still benefit from embodiments of the invention, as may wavelength monitoring applications that are using silica PICs in increased temperature ranges, e.g. in industrial furnaces.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments. Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A photonic integrated chip for temperature-compensated wavelength monitoring of at least one spectral line in a predetermined range of operating temperatures of the photonic integrated chip, comprising:
   an optical filter having a spectral response curve comprising at least one of a wavelength passband, for selecting at least one spectral reference line from a wavelength continuum in a source signal applicable to the filter, and
   a first spectrometer having a spectral response curve comprising a plurality of wavelength channels, an input of the first spectrometer being connected to the optical filter to receive the at least one spectral reference line selected by the filter, the first spectrometer being configured for detecting wavelength drifts of each received spectral reference line in response to temperature variations of the photonic chip;
   wherein the first spectrometer or a further spectrometer of the photonic chip is configured for receiving said at least one spectral line to be monitored and for detecting wavelength shifts thereof,
   wherein the at least one wavelength passband of the optical filter is spectrally overlapping at least one wavelength channel of the plurality of wavelength channels of the first spectrometer for each temperature in said range of operating temperatures of the photonic integrated chip, and
   wherein a thermal wavelength drift rate for the spectral response curve of the optical filter differs from a thermal wavelength drift rate for the spectral response curve of the first spectrometer at least by an amount such that, over the entire range of operating temperatures of the photonic integrated chip, an effective resolving power associated with the spectrometer receiving said at least one spectral line to be monitored is at least 50% of a nominal resolving power in respect of that same spectrometer.

2. The photonic integrated chip according to claim 1, wherein the first and/or the further spectrometer is provided as one of the group consisting of arrayed waveguide grating, echelle grating, cascaded Mach-Zehnder interferometer, cascaded ring filter.

3. The photonic integrated chip according to claim 1, wherein the optical filter comprises a high-finesse resonator.

4. The photonic integrated chip according to claim 3, wherein the high-finesse resonator comprises a ring resonator.

5. The photonic integrated chip according to claim 1, wherein the optical filter comprises at least one bandpass filter with a wavelength passband smaller than a free spectral range of the first spectrometer.

6. The photonic integrated chip according to claim 1, wherein adjacent wavelength channels of at least the first spectrometer are partially overlapping in a spectral overlap region such that a spectral line comprised by the spectral overlap region is simultaneously detectable in at least two adjacent wavelength channels above a noise floor.

7. The photonic integrated chip according to claim 1, wherein the optical filter and each spectrometer are formed in a silicon-on-insulator substrate or are formed in a substrate comprising a silicon nitride-based material or an indium phosphide-based material.

8. The photonic integrated chip according to claim 1, wherein a photodetector is connected to an output of at least the first spectrometer.

9. The photonic integrated chip according to claim 1, wherein the first spectrometer is configured for receiving the at least one spectral line to be monitored and the at least one spectral reference line at a same input via an optical combiner structure of the photonic integrated chip,
wherein the first spectrometer is configured for receiving the at least one spectral line to be monitored and the at least one spectral reference line at different inputs.

10. The photonic integrated chip according to claim 1, wherein the further spectrometer is configured for receiving the at least one spectral line to be monitored at an input thereof.

11. A wavelength monitoring device comprising:
the photonic integrated chip according to claim 1,
at least one photodetector for detecting spectral response signals in each of a plurality of spectrometer output channels, and
a processing unit configured for:
receiving the detected spectral response signals from the photodetector as inputs,
determining a thermal wavelength drift of each spectral reference line relative to the spectral response curve of the first spectrometer based on the inputs,
determining, based on the inputs, a wavelength shift of each spectral line to be monitored relative to the spectral response curve of the spectrometer receiving the at least one spectral line to be monitored,
compensating the determined wavelength shift of each spectral line to be monitored by a corresponding temperature compensation value derived from the determined thermal wavelength drifts and calibration data;
wherein the calibration data associates a predetermined thermal wavelength drift of the at least one spectral reference line relative to the spectral response curve of the first spectrometer with a predetermined thermal wavelength drift for the spectral response curve of the first or the further spectrometer relative to a fixed calibration spectral line.

12. The wavelength monitoring device according to claim 11, wherein the processing unit is further configured for accessing and retrieving the calibration data from a memory storing the calibration data.

13. The wavelength monitoring device according to claim 11, further comprising a light source connected to the optical filter for providing the source signal applicable to the optical filter, the light source being capable of generating a wavelength continuum.

14. A temperature compensation method for wavelength monitoring using the photonic integrated chip of claim 1, the method comprising:
applying a source signal comprising a wavelength continuum to the optical filter,
detecting spectrometer response signals in respect of each of a plurality of spectrometer output channels,
based on the plurality of detected spectrometer response signals, determining a thermal wavelength drift of each spectral reference line relative to the first spectrometer spectral response curve, and determining a wavelength shift of each spectral line to be monitored relative to the spectral response curve of the spectrometer receiving the at least one spectral line to be monitored,
comparing the determined thermal wavelength drift of the at least one spectral reference line with a plurality of predetermined thermal wavelength drifts of the at least one spectral reference line relative to the spectral response curve of the first spectrometer to obtain an associated predetermined thermal wavelength drift of the spectral response curve of the spectrometer receiving the at least one spectral line to be monitored relative to a fixed calibration line and independent of the optical filter, or evaluating a parametric model function for the determined thermal wavelength drift of the at least one spectral reference line as function argument to obtain an associated predetermined thermal wavelength drift of the spectral response curve of the spectrometer receiving the at least one spectral line to be monitored relative to a fixed calibration line and independent of the optical filter,
compensating the determined wavelength shift of each spectral line to be monitored by the obtained associated thermal wavelength drift of the spectral response curve of the spectrometer receiving the at least one spectral line to be monitored.

15. The method according to claim 14, further comprising:
applying a fixed spectral calibration line to the input of the spectrometer configured for receiving the at least one spectral line to be monitored and,
based on the plurality of detected spectrometer response signals, determining a thermal wavelength drift of the spectral response curve of the spectrometer configured for receiving the at least one spectral line to be monitored relative to the fixed spectral calibration line,
recording, for each temperature in the predetermined range of operating temperatures of the photonic integrated chip, the determined thermal wavelength drift of each spectral reference line and, associated thereto, the determined thermal wavelength drift of the spectral response curve of the spectrometer configured for receiving the at least one spectral line to be monitored, the photonic integrated chip being held at a same temperature during recording.

16. A method according to any of the claim 14, wherein obtaining the associated thermal wavelength drift of the spectrometer configured for receiving the at least one spectral line to be monitored takes into account wavelength dispersion over the plurality of wavelength channels and/or predetermined waveguide geometry statistics for a wafer comprising the photonic integrated chip.

\* \* \* \* \*